United States Patent
Bussat

(10) Patent No.: US 9,460,332 B1
(45) Date of Patent: Oct. 4, 2016

(54) CAPACITIVE FINGERPRINT SENSOR INCLUDING AN ELECTROSTATIC LENS

(71) Applicant: Apple Inc., Cupertino, CA (US)

(72) Inventor: Jean-Marie Bussat, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 14/481,568

(22) Filed: Sep. 9, 2014

Related U.S. Application Data

(60) Provisional application No. 61/875,564, filed on Sep. 9, 2013.

(51) Int. Cl.
*G06K 9/00* (2006.01)
*G06F 3/044* (2006.01)

(52) U.S. Cl.
CPC .............. *G06K 9/0002* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 3,876,942 A | 4/1975 | Koster | |
| 4,421,418 A | 12/1983 | Morishima | |
| 5,650,597 A | 7/1997 | Redmayne | |
| 5,731,222 A | 3/1998 | Malloy et al. | |
| 5,953,441 A | 9/1999 | Setlak | |
| 5,963,679 A | 10/1999 | Setlak | |
| 6,049,620 A | 4/2000 | Dickinson et al. | |
| 6,067,368 A | 5/2000 | Setlak et al. | |
| 6,088,471 A | 7/2000 | Setlak et al. | |
| 6,259,804 B1 | 7/2001 | Setlak et al. | |
| 6,327,376 B1 | 12/2001 | Harkin | |
| 6,400,359 B1 | 6/2002 | Katabami | |
| 6,483,931 B2 | 11/2002 | Kalnitsky et al. | |
| 6,522,773 B1 | 2/2003 | Houdeau | |
| 6,628,812 B1 | 9/2003 | Setlak | |
| 6,647,133 B1 | 11/2003 | Morita et al. | |
| 6,734,655 B1 | 5/2004 | Javanifard | |
| 6,737,329 B2 | 5/2004 | Lepert et al. | |
| 6,815,657 B2 | 11/2004 | Toyoshima et al. | |
| 6,882,338 B2 | 4/2005 | Flowers | |
| 6,906,529 B2 | 6/2005 | Blanchard | |
| 6,996,492 B1 * | 2/2006 | Testoni | G01N 23/2252 378/137 |
| 7,042,317 B2 | 5/2006 | Xiao et al. | |
| 7,194,113 B2 | 3/2007 | Greschitz et al. | |
| 7,202,764 B2 | 4/2007 | Deligianni et al. | |
| 7,227,213 B2 | 6/2007 | Mastromatteo et al. | |
| 7,236,765 B2 | 6/2007 | Bonicatto et al. | |

(Continued)

FOREIGN PATENT DOCUMENTS

| | | |
|---|---|---|
| AU | 2013100571 | 5/2013 |
| CN | 1164075 | 11/1997 |

(Continued)

OTHER PUBLICATIONS

Motorola User Guide, Motorola Atrix™ 4G (MB860), Manual No. 68XXXXX468-A, Motorola Mobility Inc., 2011, 90 pages.

(Continued)

*Primary Examiner* — Aaron W Carter
(74) *Attorney, Agent, or Firm* — Brownstein Hyatt Farber Schreck, LLP

(57) ABSTRACT

A capacitive fingerprint sensor, including: a dielectric structure having a contact surface and a sensor surface; an array of capacitive sensing elements held on or near the sensor surface of the dielectric structure; and an electrostatic lens formed within the dielectric structure.

31 Claims, 19 Drawing Sheets

(56) References Cited

U.S. PATENT DOCUMENTS

| | | | |
|---|---|---|---|
| 7,251,351 B2 | 7/2007 | Mathiassen | |
| 7,262,609 B2 | 8/2007 | Reynolds | |
| 7,290,323 B2 | 11/2007 | Deconde et al. | |
| 7,318,550 B2 | 1/2008 | Bonalle et al. | |
| 7,397,096 B2 | 7/2008 | Chou et al. | |
| 7,403,749 B2 | 7/2008 | Kuijstermans et al. | |
| 7,460,109 B2 | 12/2008 | Safai et al. | |
| 7,521,942 B2 | 4/2009 | Reynolds | |
| 7,536,039 B2 | 5/2009 | Shinoda et al. | |
| 7,548,636 B2 | 6/2009 | Shimamura et al. | |
| 7,583,092 B2 | 9/2009 | Reynolds et al. | |
| 7,683,638 B2 | 3/2010 | Chuang et al. | |
| 7,705,613 B2 | 4/2010 | Misra | |
| 7,757,096 B2 | 7/2010 | Murata et al. | |
| 7,777,501 B2 | 8/2010 | Reynolds et al. | |
| 7,902,474 B2 | 3/2011 | Mittleman et al. | |
| 7,986,153 B2 | 7/2011 | Easter | |
| 8,031,916 B2 | 10/2011 | Abiko et al. | |
| 8,041,083 B2 | 10/2011 | Pai et al. | |
| 8,073,204 B2 | 12/2011 | Kramer et al. | |
| 8,093,099 B2 | 1/2012 | Purushothaman et al. | |
| 8,107,212 B2 | 1/2012 | Nelson et al. | |
| 8,111,136 B2 | 2/2012 | Wong et al. | |
| 8,116,540 B2 | 2/2012 | Dean et al. | |
| 8,174,372 B2 | 5/2012 | da Costa | |
| 8,195,117 B2 | 6/2012 | Bult et al. | |
| 8,283,934 B2 | 10/2012 | Nishizono | |
| 8,305,360 B2 | 11/2012 | Wu | |
| 8,358,816 B2 | 1/2013 | Sherlock et al. | |
| 8,366,633 B2 | 2/2013 | Wolf | |
| 8,456,330 B2 | 6/2013 | Filson et al. | |
| 8,461,948 B2 | 6/2013 | Pulskamp | |
| 8,482,381 B2 | 7/2013 | Chatterjee et al. | |
| 8,482,546 B2 | 7/2013 | Chai et al. | |
| 8,598,555 B2 | 12/2013 | Guerrero | |
| 8,606,227 B2 | 12/2013 | Karam et al. | |
| 8,716,613 B2 | 5/2014 | Perezselsky et al. | |
| 8,717,775 B1 | 5/2014 | Bolognia et al. | |
| 8,723,062 B2 | 5/2014 | Chen | |
| 8,724,038 B2 | 5/2014 | Ganapathi et al. | |
| 8,736,001 B2 | 5/2014 | Salatino et al. | |
| 8,743,082 B2 | 6/2014 | Ganapathi et al. | |
| 8,743,083 B2 | 6/2014 | Zanone et al. | |
| 8,749,523 B2 | 6/2014 | Pance et al. | |
| 8,779,540 B2 | 7/2014 | Kerness et al. | |
| 8,780,071 B2 | 7/2014 | Chen | |
| 8,782,775 B2 | 7/2014 | Fadell et al. | |
| 8,791,792 B2 | 7/2014 | Benkley | |
| 8,797,298 B2 | 8/2014 | Brosnan et al. | |
| 8,841,749 B2 | 9/2014 | Joblot et al. | |
| 8,860,683 B2 | 10/2014 | Baumbach | |
| 8,866,347 B2 | 10/2014 | Benkley, III | |
| 8,888,004 B2 | 11/2014 | Setlak et al. | |
| 8,890,016 B2 | 11/2014 | Silverman | |
| 8,907,897 B2 | 12/2014 | Ferren et al. | |
| 9,065,321 B2 | 6/2015 | Divan et al. | |
| 9,110,538 B2 | 8/2015 | Dunko et al. | |
| 9,135,495 B1 | 9/2015 | Pope et al. | |
| 9,153,490 B2 | 10/2015 | Mitsuhashi et al. | |
| 9,158,958 B2 | 10/2015 | Wickboldt et al. | |
| 9,239,655 B2 | 1/2016 | Hershman | |
| 9,316,677 B2* | 4/2016 | Grunthaner | G01R 31/021 |
| 2005/0156906 A1 | 7/2005 | Chiu | |
| 2006/0060789 A1* | 3/2006 | Rogers | H01J 37/153 |
| | | | 250/396 ML |
| 2006/0110015 A1* | 5/2006 | Rowe | G06K 9/00013 |
| | | | 382/124 |
| 2007/0076923 A1 | 4/2007 | Chiu | |
| 2008/0049980 A1 | 2/2008 | Castaneda et al. | |
| 2008/0238878 A1 | 10/2008 | Wang | |
| 2009/0008729 A1 | 1/2009 | Yang et al. | |
| 2009/0079698 A1* | 3/2009 | Takashima | G06F 3/0224 |
| | | | 345/169 |
| 2009/0085879 A1 | 4/2009 | Dai et al. | |
| 2009/0260900 A1* | 10/2009 | Ure | G06F 3/03545 |
| | | | 178/19.03 |
| 2010/0110019 A1 | 5/2010 | Ozias et al. | |
| 2010/0156595 A1 | 6/2010 | Wong et al. | |
| 2010/0176271 A1 | 7/2010 | Krim et al. | |
| 2010/0201485 A1 | 8/2010 | Chou | |
| 2010/0321159 A1 | 12/2010 | Stewart | |
| 2011/0102569 A1 | 5/2011 | Erhart | |
| 2011/0122082 A1 | 5/2011 | Orellana | |
| 2011/0234623 A1* | 9/2011 | Ure | G06F 3/03545 |
| | | | 345/592 |
| 2011/0267298 A1 | 11/2011 | Erhart | |
| 2011/0298711 A1 | 12/2011 | Dean et al. | |
| 2012/0090757 A1 | 4/2012 | Buchan et al. | |
| 2012/0097510 A1 | 4/2012 | Mitchell | |
| 2012/0113044 A1 | 5/2012 | Strazisar et al. | |
| 2012/0242635 A1 | 9/2012 | Erhart et al. | |
| 2012/0267740 A1 | 10/2012 | Okamoto | |
| 2012/0287587 A1 | 11/2012 | Los | |
| 2013/0015868 A1 | 1/2013 | Peng | |
| 2013/0141388 A1 | 6/2013 | Ludwig | |
| 2013/0194071 A1 | 8/2013 | Slogedal | |
| 2013/0221988 A1* | 8/2013 | Grunthaner | G01R 31/021 |
| | | | 324/627 |
| 2013/0271422 A1 | 10/2013 | Hotelling et al. | |
| 2013/0279769 A1 | 10/2013 | Benkley | |
| 2013/0307818 A1 | 11/2013 | Pope et al. | |
| 2013/0341526 A1* | 12/2013 | Ohashi | H01J 3/18 |
| | | | 250/396 R |
| 2014/0015774 A1* | 1/2014 | Bussat | G06F 3/0418 |
| | | | 345/173 |
| 2014/0071085 A1* | 3/2014 | Kasamatsu | G06F 3/041 |
| | | | 345/174 |
| 2014/0103943 A1 | 4/2014 | Dunlap et al. | |
| 2014/0135597 A1 | 5/2014 | Wolf | |
| 2014/0216914 A1 | 8/2014 | Pope et al. | |
| 2014/0218339 A1 | 8/2014 | Hotelling et al. | |
| 2014/0224985 A1* | 8/2014 | Rodgers | H01J 37/09 |
| | | | 250/307 |
| 2014/0241595 A1 | 8/2014 | Bernstein | |
| 2014/0361395 A1 | 12/2014 | Bhagavat et al. | |
| 2015/0002459 A1* | 1/2015 | Watanabe | G06F 3/0418 |
| | | | 345/174 |
| 2015/0022495 A1 | 1/2015 | Bussat et al. | |
| 2015/0023570 A1* | 1/2015 | Bussat | G06K 9/00013 |
| | | | 382/124 |
| 2015/0036065 A1 | 2/2015 | Yousefpor et al. | |
| 2015/0070079 A1 | 3/2015 | Yang et al. | |
| 2015/0071509 A1 | 3/2015 | Myers | |
| 2015/0248574 A1* | 9/2015 | Mrazek | G06K 9/00033 |
| | | | 382/124 |
| 2016/0004896 A1 | 1/2016 | Pope et al. | |
| 2016/0092714 A1* | 3/2016 | Yazdandoost | G06F 3/0436 |
| | | | 345/177 |
| 2016/0092715 A1* | 3/2016 | Yazdandoost | G06K 9/00026 |
| | | | 382/124 |
| 2016/0092716 A1* | 3/2016 | Yazdandoost | G06K 9/0002 |
| | | | 382/124 |
| 2016/0217311 A1 | 7/2016 | Bhagavat et al. | |

FOREIGN PATENT DOCUMENTS

| | | |
|---|---|---|
| CN | 1164076 | 11/1997 |
| CN | 1172308 | 2/1998 |
| CN | 1278347 | 12/2000 |
| CN | 1450489 | 10/2003 |
| CN | 1463409 | 12/2003 |
| CN | 1538142 | 10/2004 |
| CN | 1680818 | 10/2005 |
| CN | 1802882 | 7/2006 |
| CN | 101281589 | 10/2008 |
| CN | 101339951 | 1/2009 |
| CN | 101809581 | 8/2010 |

(56) References Cited

FOREIGN PATENT DOCUMENTS

| | | |
|---|---|---|
| CN | 101901092 | 12/2010 |
| CN | 202153359 | 2/2012 |
| EP | 0457398 | 11/1991 |
| EP | 0791899 | 8/1997 |
| EP | 0924656 | 6/1999 |
| EP | 1775674 | 4/2007 |
| JP | 2001339057 | 12/2001 |
| JP | 2012083829 | 4/2012 |
| KR | 20080035133 | 4/2008 |
| TW | M327066 U | 2/2008 |
| TW | 200937306 | 9/2009 |
| TW | 201017554 | 5/2010 |
| TW | 201017555 | 5/2010 |
| TW | 201229852 | 7/2012 |
| TW | 201346779 | 11/2013 |
| WO | WO 01/59558 | 8/2001 |
| WO | WO 2004/098083 | 11/2004 |
| WO | WO 2005/124659 | 12/2005 |
| WO | WO 2014/128249 | 8/2014 |

OTHER PUBLICATIONS

Motorola Atrix (MB860), Manual No. 68014798001-B, Motorola Mobility Argentina S.A., 2011, 68 pages.
U.S. Appl. No. 13/842,635, filed Mar. 15, 2013, Hotelling et al.
U.S. Appl. No. 13/842,920, filed Mar. 15, 2013, Pope et al.
U.S. Appl. No. 14/022,058, filed Sep. 9, 2013, Yang et al.
U.S. Appl. No. 14/247,419, filed Apr. 8, 2014, Pope et al.
U.S. Appl. No. 14/251,304, filed Apr. 11, 2014, Hotelling et al.
U.S. Appl. No. 14/256,888, filed Apr. 18, 2014, Myers.
U.S. Appl. No. 14/294,903, filed Jun. 3, 2014, Bhagavat et al.
U.S. Appl. No. 14/335,553, filed Jul. 18, 2014, Bussat et al.
U.S. Appl. No. 14/855,123, filed Sep. 15, 2015, Pope et al.
U.S. Appl. No. 14/709,388, filed May 11, 2015, Pope et al.
Author Unknown, "DC-to-DC converter," Wikipedia, the free encyclopedia, Apr. 12, 2012, XP 055092945, retrieved from the internet on Dec. 11, 2013: URL:http://en.wikipedia.org/w/index.php?title=DC-to-DC_converter&oldid=487061873.
Setlak, Chapter 2: Advances in Fingerprint Sensors Using RF Imaging Techniques, *Automatic Fingerprint Recognition Systems*, Editor: Ratha et al., 2003, New York, Springer Verlag, US, pp. 27-53, XP002347781, ISBN: 978-0-387-95593-3.

* cited by examiner

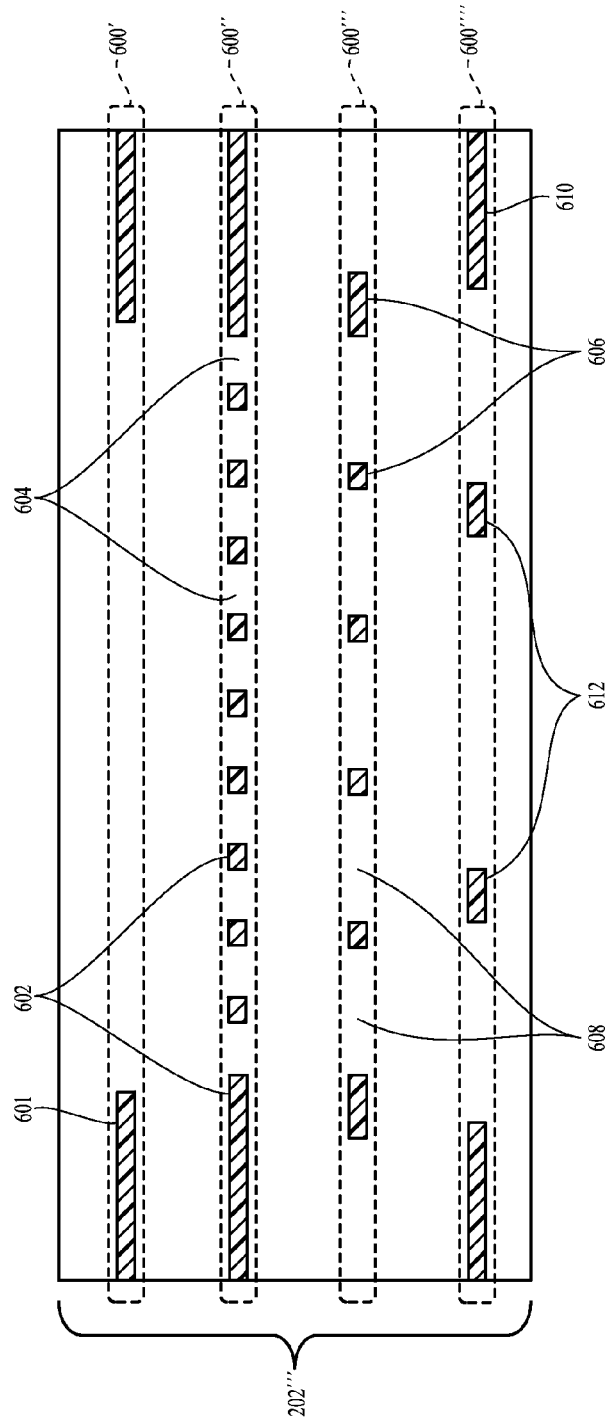
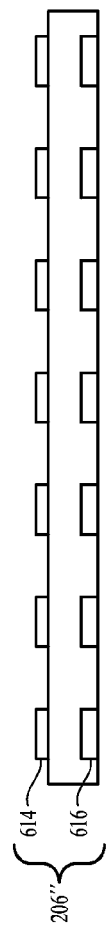
FIG. 6E
FIG. 6F ptableCAPACITIVE FINGERPRINT SENSOR INCLUDING AN ELECTROSTATIC LENS

CROSS-REFERENCE TO RELATED APPLICATION

This application claims the benefit under 35 U.S.C. §119(e) of U.S. Provisional Patent Application No. 61/875,564, which was filed on Sep. 9, 2013, and entitled "Capacitive Fingerprint Sensor Including an Electrostatic Lens," which is incorporated by reference as if fully disclosed herein.

TECHNICAL FIELD

This application generally relates to capacitive fingerprint sensing systems, and more particularly to the use of an electrostatic lens to increase the resolution of a capacitive sensing system.

BACKGROUND

There is considerable interest in providing consumer electronic devices, including smart phones, computers, electronic tablets, and so on, with various means of securing information stored on these devices. Biometric security systems, such as fingerprint recognition systems, are one approach to providing these security features. These systems may not require memorization, or the use of any other device by the user, as security may be based on unique features of the user. Biometric security systems also provide the potential advantage being difficult to 'crack' for the same reasons.

Fingerprint recognition systems generally collect fingerprint images and compare those images against a database of known fingerprint information. For example, after a set of fingerprint images for a known authorized user is collected and processed, a user wishing access can be authorized by collecting one or more fingerprint images for that accessing user and comparing these collected images against known fingerprint information for the authorized user. One example of a fingerprint recognition system uses capacitive sensing elements to detect fingerprint images for collection. Such sensors are able to detect electric field differences between ridges and valleys of the fingerprint of a finger in contact with a contact surface of the consumer electronic device adapted for this purpose.

The effectiveness of biometric security systems may be affected by the accuracy with which the unique biometric data on which they are based is able to be detected. In the case of fingerprint identification systems, this means that improved detection resolution may lead to improved security for the secured device. Thus, improving detection resolution is a significant issue in such systems.

Another issue for consumer electronic devices is the availability of space within the device housing, including the amount and the location of this space. Many components contend for this space in the design process. Available surface space is often a particularly limited resource, which leads to designs in which multiple components share surface space. Sometimes this is due to space limitation, sometimes, such as setting a touchscreen over a display stack, this multi-tasking of surface space can lead to additional functionality.

In the case of fingerprint recognition systems that include arrays of capacitive sensing elements to detect the fingerprint images, i.e. capacitive fingerprint sensors, there may be a number of reasons for these components to axially aligned with other components of the consumer electronics device, such as display stacks and touch screens, not the least of which is an interest in avoiding assigning valuable surface space exclusively to an component that may only be used briefly during the process of identifying the user. However, several issues, such as the opacity of the capacitive sensing elements may consign the capacitive fingerprint sensor to a location behind these other components. Thus, the distance from the outer surface of the device, i.e. the cover glass, which serves as the contact surface for the capacitive fingerprint sensor, and the array of capacitive sensing elements may be large enough to affect the resolution of the sensor. This is because such separations may lead to blurring of the electric field and a corresponding loss of resolution of the fingerprint images detected by the capacitive sensor.

SUMMARY

One example embodiment, as described herein, is a capacitive fingerprint sensor, including: a dielectric structure having a contact surface and a sensor surface; an array of capacitive sensing elements held on or near the sensor surface of the dielectric structure; and an electrostatic lens formed within the dielectric structure.

Another example embodiment, as described herein, is a capacitive fingerprint sensor, including: a surface layer; a display stack coupled to the surface layer; an electrostatic lens coupled to the display stack; and an array of capacitive sensing elements coupled to the electrostatic lens.

A further example embodiment, as described herein, is a method for tuning an electrostatic lens used in a capacitive fingerprint sensor, in which the electrostatic lens includes one or more patterned conductive layer(s). A relative voltage of each of the patterned conductive layer(s) is set to an initial voltage relative to the array of capacitive sensing elements of the capacitive fingerprint sensor. A baseline fingerprint image is collected. The relative voltage of one of the patterned conductive layer(s) is adjusted by a selected voltage step. A new fingerprint image is collected. The new image resolution of the new fingerprint image is compared to the baseline resolution of the baseline fingerprint image. If the new image resolution is finer that the baseline resolution, then the baseline image is replaced with the new image, a tuned flag is set, and the relative voltage of the patterned conductive layer is adjusted again, a new image collected and resolutions compared. Otherwise, if the tuned flag is set, the tuned relative voltage of the patterned conductive layer is set to its preceding relative voltage. However, if the tuned flag was not set, the tuned flag is now set, the relative voltage is reset to the initial voltage, the sign of the selected voltage step is switched. The relative voltage is again adjusted, a new image collected and its resolution compared to the baseline.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the embodiments are best understood from the following detailed description when read in connection with the accompanying drawing. It should be understood that the various features of the drawing may not be to scale. Likewise, the dimensions of the various features may be altered for clarity. Included in the drawings and/or illustrations are the following figures:

FIG. 6E is a cross-section drawing of the example patterned conductive layers of FIGS. 6A-6D taken along dotted line 6E-6E, illustrated in an example relationship to the example capacitive sensor array of FIGS. 5A and 5B;

FIG. 6F is a cross-section drawing of another example capacitive sensor array of FIGS. 5A and 5B;

DETAILED DESCRIPTION

As discussed above, there is significant interest in including biometric security systems, such as capacitive fingerprint sensors in various consumer electronics devices. However, due to space constraints in these devices, implementation of capacitive fingerprint sensors in these devices may lead to product designs in which there is a significant separation between the contact surface on which the user's finger is placed and the array of capacitive sensing elements. The separation may lead to blurring of the electric field produced by the finger and reduced resolution of the capacitive fingerprint sensor.

Example embodiments described herein may reduce this blurring of the electric field between the contact surface and the array of capacitive sensing elements, thereby improving the resolution of the detected fingerprint images and allowing for effective image sensing with increased separation between the contact surface and the array of capacitive sensing elements, thus allowing increased design options in consumer electronic devices that include capacitive fingerprint sensors. These example embodiments include an electronic lens between the contact surface and the array of capacitive sensing elements to shape the electric field in this region.

Example electrostatic lens, as described herein, include one or more patterned conductive layer(s). Each patterned conductive layer is located at a predetermined distance from the contact surface of the dielectric structure and is substantially parallel to the contact surface. These patterned conductive layers may be formed from various conductive materials, such as: copper; silver; aluminum; gold; nickel; titanium; tungsten; carbon nanotubes; polysilicon; indium tin oxide; conductive polymers or a combination thereof. These patterned conductive layers may be formed on dielectric layers within a dielectric structure by a number of processes, such as deposition and etching or printing. Alternatively, these patterned conductive layers may be formed as separate elements, such as metal sheets fixed in place along one or more edge(s).

During operation, each example patterned conductive layer may be substantially maintained at a predetermined voltage relative to the array of capacitive sensing elements.

Figure 3A:
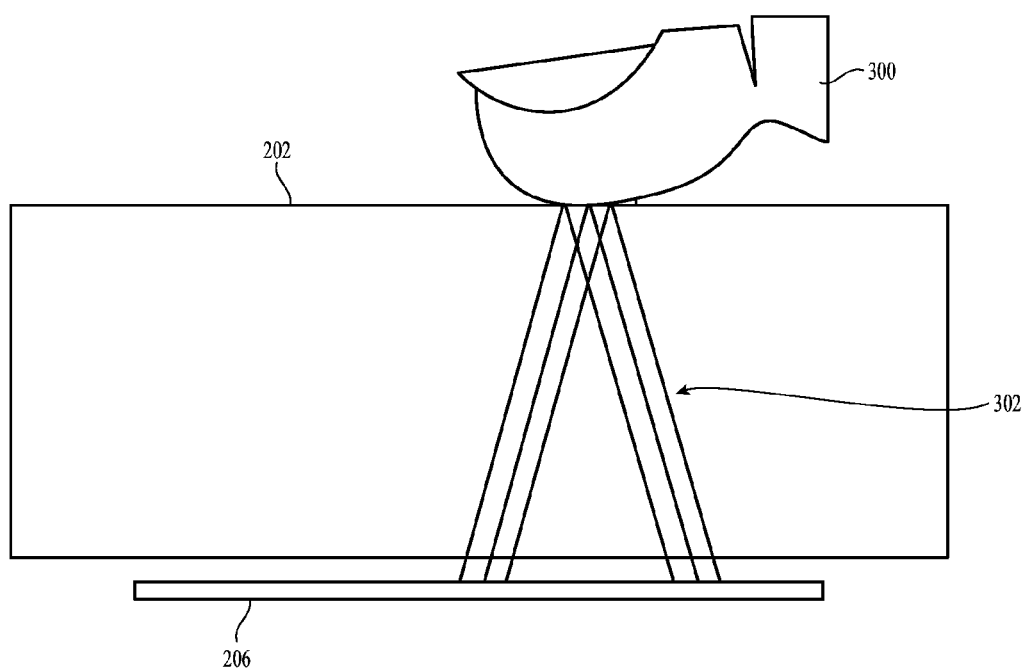
FIG. 3A is a cross-section drawing taken along dotted line 2-2 in FIG. 1 of an example capacitive sensor array and dielectric structure that may be incorporated in the example consumer electronic device of FIGS. 1 and 2, illustrating the spreading of the electric field of a user's finger.
Figure 3B:
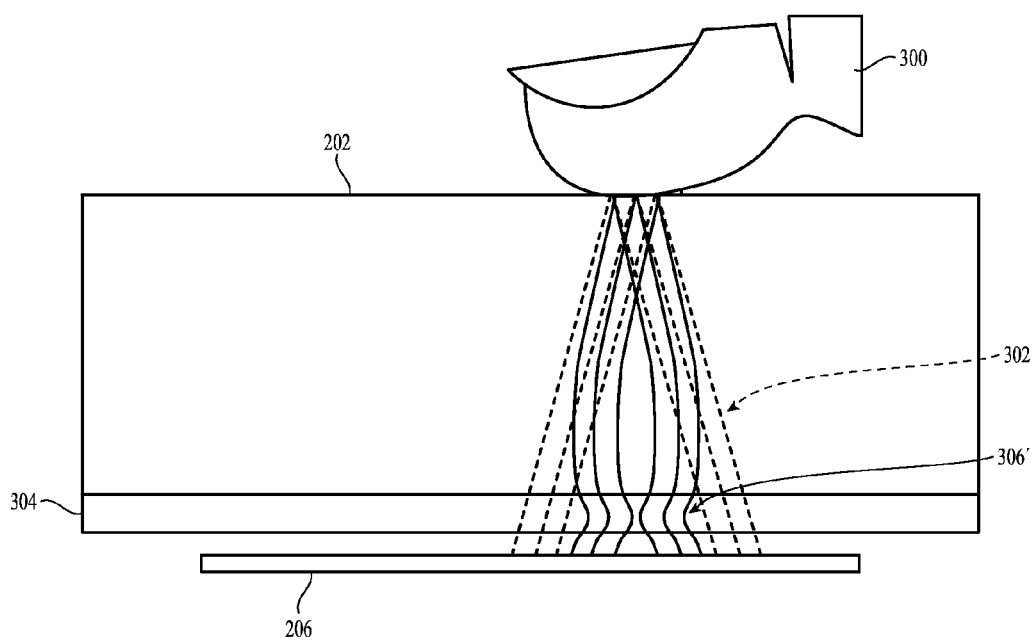
FIG. 3B is a cross-section drawing of an example capacitive sensor array and dielectric structure of FIG. 3A including an example electrostatic lens to reduce spreading of the electric field of a user's finger.
Figure 3C:
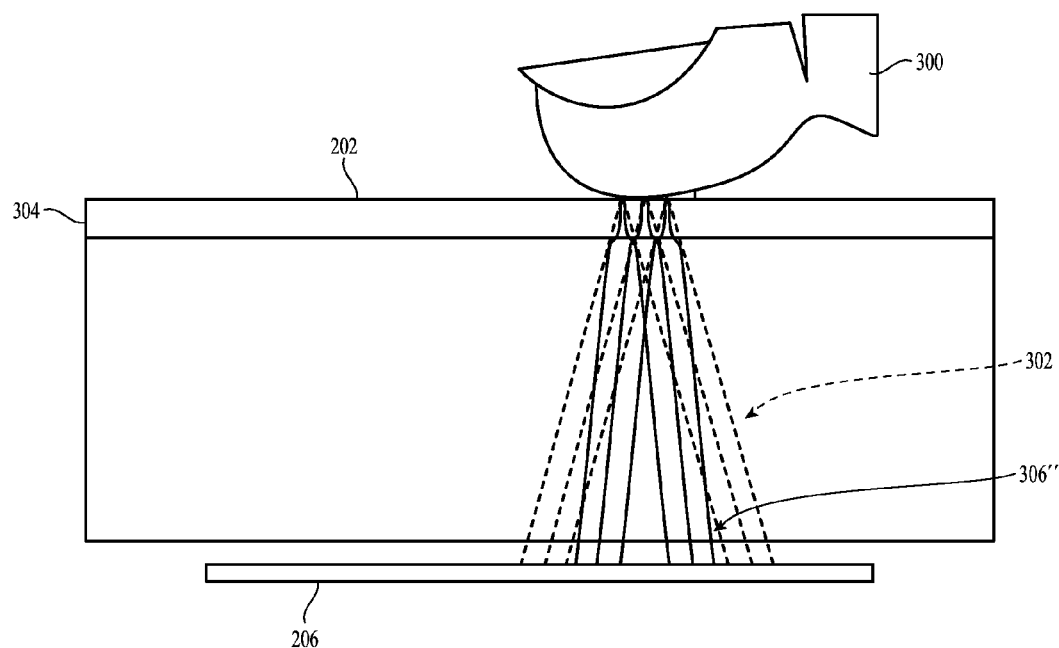
FIG. 3C is a cross-section drawing of an example capacitive sensor array and dielectric structure of FIG. 3A including another example electrostatic lens to reduce spreading of the electric field of a user's finger.

In example embodiments described herein, the position(s), relative voltage(s), and shapes of the patterned conductive layer(s) may be selected to substantially shape the electric field associated with a user's finger in the region between the contact surface of the capacitive fingerprint sensor and the array of capacitive sensing elements so as to improve the resolution of the collected fingerprint image when the user's finger is placed on the contact surface. These example patterned conductive layers may be designed to shape the electric field across the entire array of capacitive sensing elements (see the example embodiment of FIGS. 6A and 6D), individual capacitive sensing elements (see the example embodiment of FIG. 6B), or subarrays (blocks) of capacitive sensing elements (see example embodiment of FIG. 6C). Examples of this shaping of the electric field associated with the user's finger are illustrated in FIGS. 3A-3C.

Specific settings for the parameters of example electrostatic lenses may be determined based on the geometry of the consumer electronics device and the effects of any intervening components, such as touchscreens and display stacks. It is noted that the relative voltage setting of the patterned conductive layer(s) may be controlled by a voltage source that provides the voltage offset to each patterned conductive layer. The voltage source may be designed so that the voltage offset provided to each patterned conductive layer is variable, thus allowing the electrostatic lens to be tuned. The example voltage source may be designed to allow tuning during fabrication, after which the voltage offset(s) may be fixed, or the example voltage source may be designed to allow dynamic tuning, which may be accomplished by user intervention or may be accomplished automatically.

Alternatively, one or more of the patterned conductive layers in an example electrostatic lens, as described herein, may be uncoupled from any voltage source and allowed to 'float,' using only its conductivity to shape the electric field.

Figure 1:
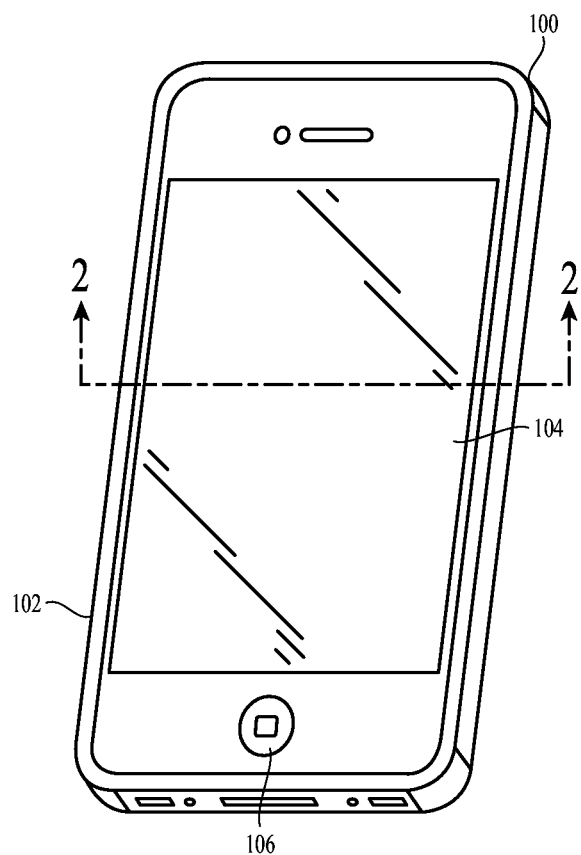
FIG. 1 is a top perspective drawing of an example consumer electronic device.
Figure 2:
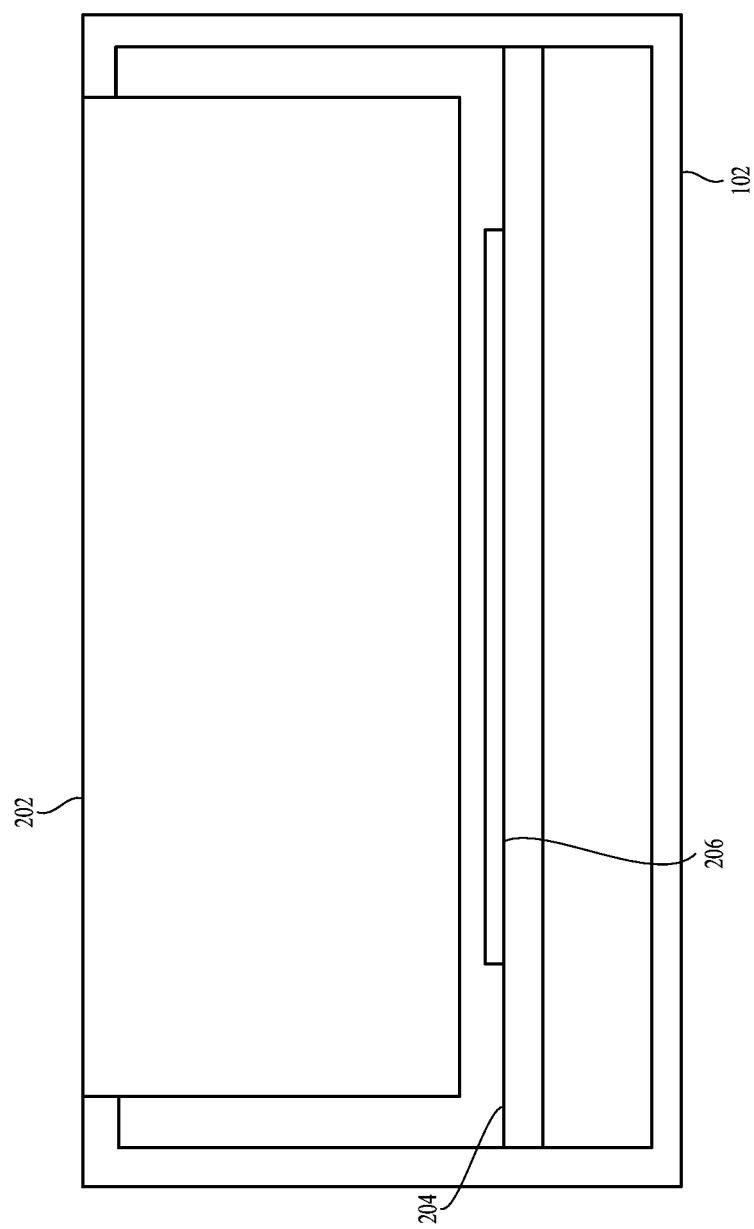
FIG. 2 is a cross-section drawing taken along dotted line 2-2 in FIG. 1 of the example consumer electronic device.

FIGS. 1 and 2 illustrate an example consumer electronics device as described herein, in this case a smart phone; however, this choice is merely illustrative and not intended as limiting. Example consumer electronics device 100 includes housing 102 and display 104. Additionally, example consumer electronics device 100 includes button 106. It is contemplated that an example capacitive fingerprint sensor, as described herein, may be incorporated within this example consumer electronics device behind button 106, behind display 104, or both. In several of the embodiments described below (for example the example embodiment of FIG. 2), an example capacitive fingerprint sensor is illustrated as being incorporated behind display 104. One skilled in the art may understand that the features of these example embodiments may be applied to example embodiments in which a capacitive fingerprint sensor is axially aligned behind button 106 as well.

FIG. 2 illustrates an example embodiment that includes a capacitive fingerprint sensor axially aligned behind at least a portion of display 104. This example device includes housing 102 and support structure 204 as structural elements. Dielectric structure 202 is coupled to housing 102 and array 206 of capacitive sensing elements is mounted on support structure 204 in this example device. In this example embodiment, one or more other device components, such as a display stack and/or a touchscreen may be interposed between the contact surface of dielectric structure 202 and array 206 of capacitive sensing elements. This arrangement is shown as one example of a design that may be used in a consumer electronic device, and is not intended as limiting. One skilled in the art will understand that numerous other design choices may be made, such as, for example, mounting array 206 of capacitive sensing elements on the back (sensor) surface of dielectric structure 202, holding array 206 in contact with the sensor surface, or even incorporating the array within the dielectric structure. Additionally, it is noted that, although support structure 204 is shown to be coupled directly to housing 102 and to extend completely across the inner cavity of the example consumer electronics device, these design choices are merely for illustrative purposes and are not intended as limiting. For example, support structure 204 may be coupled to dielectric structure 202, or support structure 204 may be coupled to the device midplate (not shown).

Example dielectric structure 202 may include a number of layers forming various components below the cover glass layer, such as a display stack or a touchscreen formed proximate to the outer (contact) surface of the dielectric structure. Example touchscreens that may be formed in dielectric structure 202 include: resistive touchscreens; capacitive touchscreens; ultrasonic touchscreens; optical touchscreens, or other touchscreens known in the art.

As noted above, the outer surface of dielectric structure 202 may be identified as the contact surface, on which a user may place their finger to have a fingerprint detected by the example capacitive fingerprint sensor. The surface of dielectric structure 202 opposite the contact surface and nearest to array 206 of capacitive sensing elements may be identified as the "sensor surface."

In the example embodiment of FIG. 2, dielectric structure 202 includes an electrostatic lens formed within the dielectric structure. Sample embodiments of electrostatic lenses are described in more detail below with reference to FIGS. 6A-6E.

FIGS. 3A-3C illustrate graphically how example electrostatic lens 304 may be used to reduce blurring (spreading) of the electric field associated with user's finger 300. FIG. 3A illustrates user's finger 300 in contact with dielectric structure 202. Cones 302 illustrate how the electric field associated with user's finger 300 spreads as the electric field extends through dielectric layer 202. Each cone 302 represents (approximately for simplicity of illustration) how electric field information associated with the portion of user's finger 300 at their apex spreads. By the point that cones 302 reach array 206 of capacitive sensing elements, this information has significant overlap, which may lead to blurring of the fingerprint image collected by array 206 of capacitive sensing elements.

FIG. 3B includes electrostatic lens 304 located proximate to the sensor surface of dielectric structure 202. This figure illustrates how electrostatic lens 304 may shape the electric field associated with a user's finger 300, altering unshaped cones 302 to produce shaped cones 306', which represent the reduced spread of electric field information from user's finger 300 due to the use of example electrostatic lens 304. As can be seen in this figure, shaping of the electric field by electrostatic lens 304 may lead to less overlap of the electric field information and, therefore, improved resolution of the fingerprint of user's finger 300 by the capacitive fingerprint sensor.

FIG. 3C illustrates an alternative embodiment in which electrostatic lens 304 is located proximate to the contact surface of dielectric structure 202. This figure provides another illustration of how electrostatic lens 304 may shape the electric field associated with user's finger 300, altering unshaped cones 302 to produce shaped cones 306". Similarly to FIG. 3B, this figure illustrates how shaping of the electric field by electrostatic lens 304 may lead to less overlap of the electric field information and, therefore, improved resolution of the fingerprint by the capacitive fingerprint sensor.

FIGS. 4A-4D show various example embodiments of dielectric structure 202 illustrated in relationship to array 206 of capacitive sensing elements. These example embodiments illustrate several specific selections of both components and arrangements of those components within dielectric structure 202 that may implemented; however, one skilled in the art will understand that these examples are merely for illustrative purposes and are not intended as limiting. It is noted that example embodiments described herein may include additional components with dielectric structure 202, such as, for example, a touchscreen component formed proximate to cover glass 400.

Figure 4A:
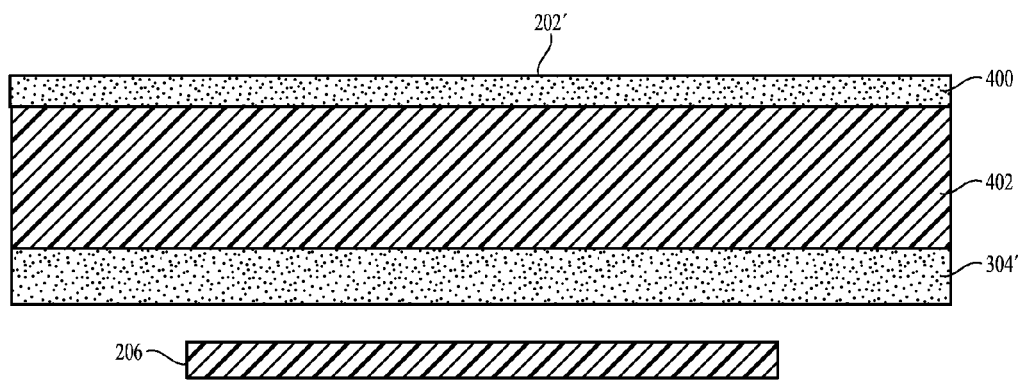
FIG. 4A is a cross-section drawing taken along dotted line 2-2 in FIG. 1 illustrating an example capacitive sensor array and an example dielectric structure including an electrostatic lens that may be incorporated in the example consumer electronic device of FIGS. 1 and 2.

Example dielectric structure 202' of FIG. 4A includes a cover glass 400 proximate to the contact surface, and example electrostatic lens 304' proximate to the sensor surface. A display stack 402 is between cover glass 400 and electrostatic lens 304'. In this example configuration, electrostatic lens 304' may be able to at least partially correct for dispersion of the electric field associated with a fingerprint to be detected due to cover glass 400 and display stack 402, in addition to helping to reduce blurring of the electric field due to distance. Further, in this example arrangement, electrostatic lens 304' may include opaque portions without concerns regarding obscuring any parts of display stack 402 because the electrostatic lens 304' is not located between display stack 402 and cover glass 400.

Example dielectric structure 202" of FIG. 4B includes drive ring 406 formed in cover glass 400 and electrostatic lens 304" proximate to the contact surface, with the display stack 402 formed below the electrostatic lens 304". Drive ring 406 may be maintained at a predetermined DC voltage relative to array 206 of capacitive sensing elements. Such offset potentials may include zero volts. Drive ring 406 may also be driven with an AC voltage about a predetermined relative DC voltage. Drive ring 406 is designed to electrically couple to the user's finger and provide a predetermined potential difference between the user's finger and array 206 of capacitive sensing elements during fingerprint image detection. This allows for larger and more controlled voltage differences between the user's finger and array 206 of capacitive sensing elements, which may improve signal to noise ratios in the capacitive fingerprint detector.

In this example configuration, electrostatic lens 304" may be able to at least partially shield array 206 of capacitive sensing elements from the electric field directly from the drive ring 406, rather than the electric field coupled through the user's finger, in addition to helping to reduce blurring of the electric due to distance.

Figure 4B:
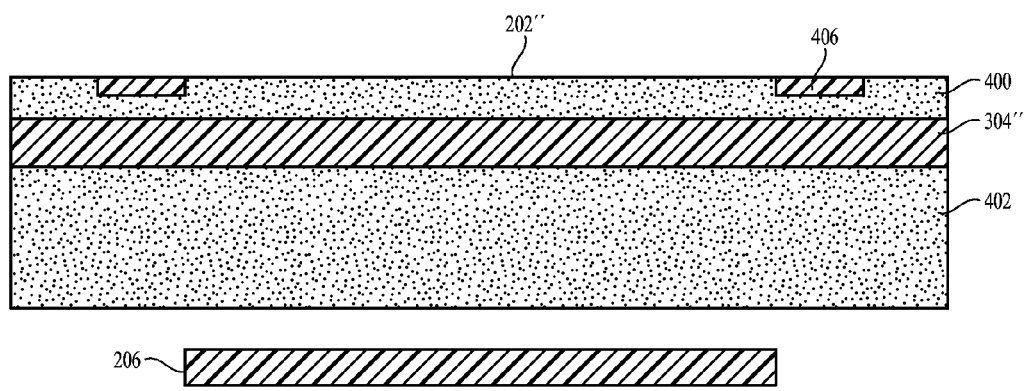
FIG. 4B is a cross-section drawing taken along dotted line 2-2 in FIG. 1 illustrating an example capacitive sensor array and another example dielectric structure including an electrostatic lens that may be incorporated in the example consumer electronic device of FIGS. 1 and 2.
Figure 4C:
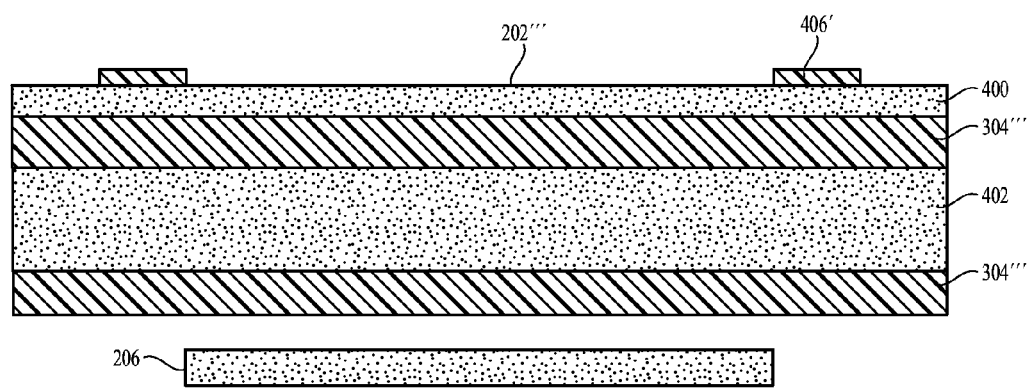
FIG. 4C is a cross-section drawing taken along dotted line 2-2 in FIG. 1 illustrating an example capacitive sensor array and a further example dielectric structure including an electrostatic lens that may be incorporated in the example consumer electronic device of FIGS. 1 and 2.

Example dielectric structure 202'" of FIG. 4C includes drive ring 406' formed on the contact surface of the cover glass 400. Example electrostatic lens 304'" is split into two portions, with one portion proximate to the contact surface and the other portion proximate to the sensor surface. The display stack 402 is between the two portions of the electrostatic lens 304'". In this example configuration, electrostatic lens 304'" may be able to at least partially shield array 206 of capacitive sensing elements from the electric field directly from the drive ring 406 and to at least partially correct for dispersion of the electric field associated with a fingerprint to be detected due to display stack 402, in addition to helping to reduce blurring of the electric due to distance.

Figure 4D:
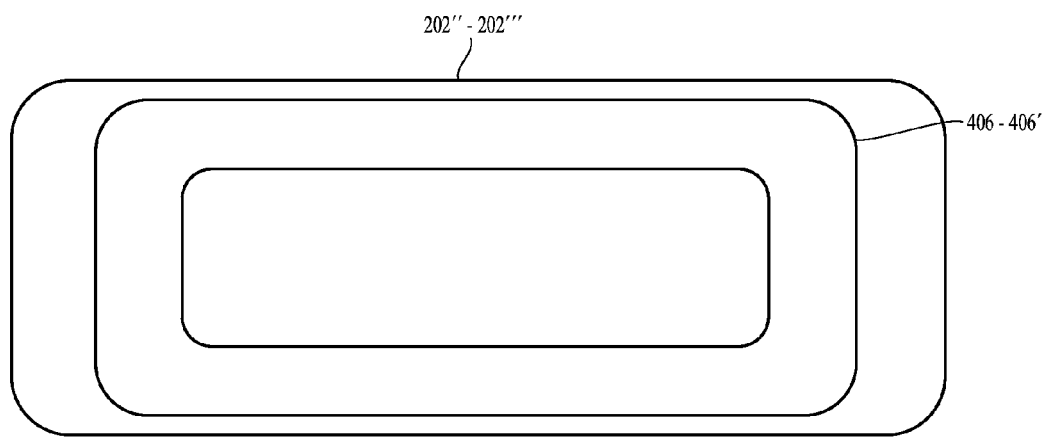
FIG. 4D is a top plan drawing illustrating example features of the example dielectric structures of FIGS. 4B and 4C.

FIG. 4D is a top plan view illustrating an example shape of example drive rings 406 and 406' of example dielectric structures 202" and 202'" of FIGS. 4B and 4C, respectively. This example shape merely illustrative and not intended as limiting.

Figure 5A:
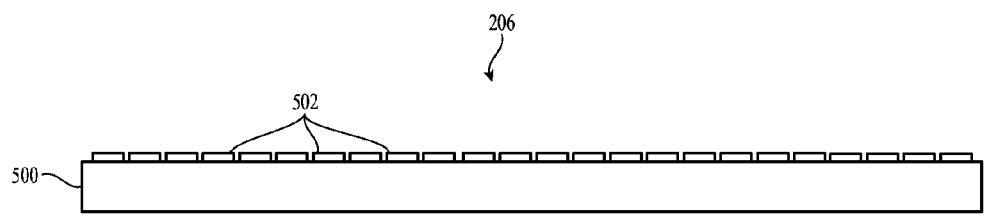
FIG. 5A is a side plan drawing illustrating an example capacitive sensor array that may be used in the example embodiments herein.
Figure 5B:
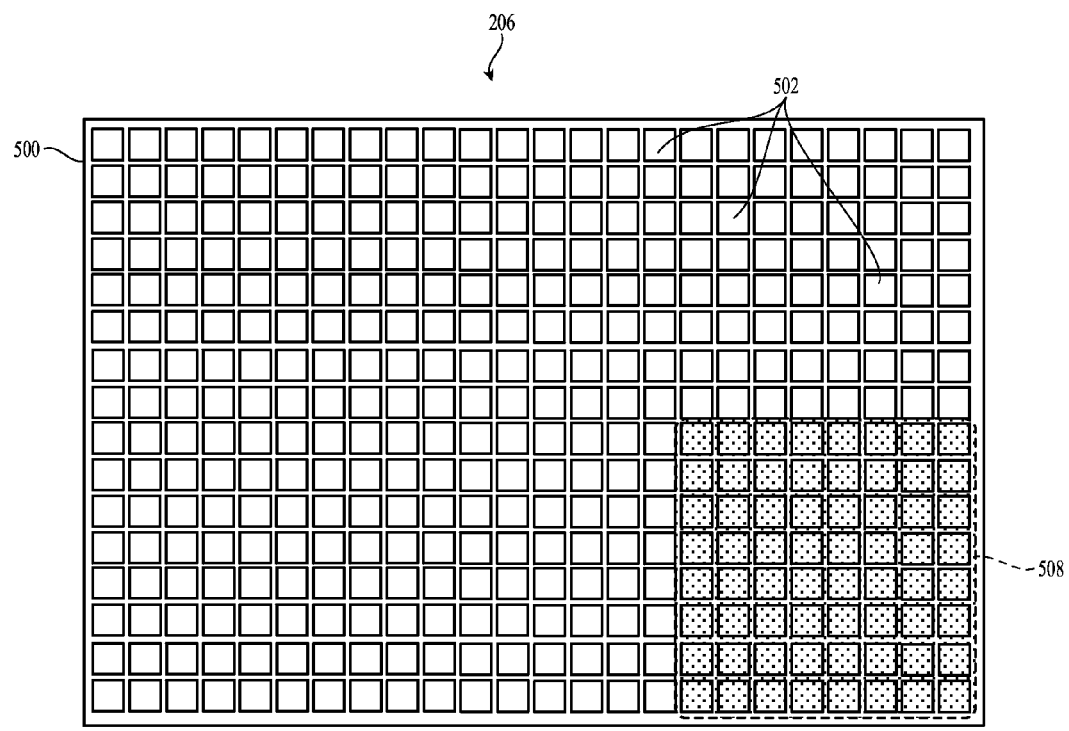
FIG. 5B is a top plan drawing of the example capacitive sensor array of FIG. 5A.

FIGS. 5A and 5B illustrate example array 206 of capacitive sensing elements. Example array 206 of capacitive sensing elements includes substrate 500 with an array of electrodes 502 formed on one side of substrate 500. In this example embodiment, the array of electrodes 502 define array 206 of capacitive sensing elements. This arrangement is merely illustrative, and is not intended as limiting. Numerous alternative example arrangements exist for array 206. For example, an array of capacitive sensing elements may be formed by two series of electrical traces arranged perpendicular to each other to form a grid. Additionally, array 206 of capacitive sensing elements is shown with square electrodes 502 arranged in a grid with equal pitches in both directions. It is noted that other electrode shapes may be used including round or non-square rectangles. Also the pitch may vary between the two dimensions.

FIG. 5B also illustrates block 508 of capacitive sensing elements. In example capacitive fingerprint sensors, it may be useful to arrange the array of capacitive sensing elements as an array of blocks of capacitive sensing elements, and to process image data detected by the subarray of capacitive sensing elements in each block together. Such block processing may reduce the resolution of collected images, but block processing may also improve the signal to noise ratio of the collected image. This block processing may be used intermittently for noisy images and/or for rough tuning of the capacitive fingerprint sensor. Alternatively, block processing may be utilized for all image collection.

Example block 508 is shown as an eight by eight subarray of capacitive sensing elements. This example is merely illustrative and not intended as limiting. One skilled in the art may understand that other block sizes may be used as well, such as example blocks of two by two subarrays of capacitive sensing elements or four by four subarrays of capacitive sensing elements.

As discussed above, example electrostatic lens, as described herein, include one or more patterned conductive layer(s). Each patterned conductive layer is located at a predetermined distance from the contact surface of the dielectric structure, is substantially parallel to the contact surface, and is substantially maintained at a predetermined voltage relative to the electrodes of the array of capacitive sensing elements.

FIGS. 6A-6E illustrate several example patterned conductive layers that may be used in example embodiments described herein. FIGS. 6A-6D are each a top plan view of one of these example patterned conductive layers, illustrating its example pattern relative to example array 206 of capacitive sensing elements. These patterns are merely illustrative and not intended as limiting. Other patterns, or geometries, may be used in sample electrostatic lens according to example embodiments described herein.

Figure 6A:
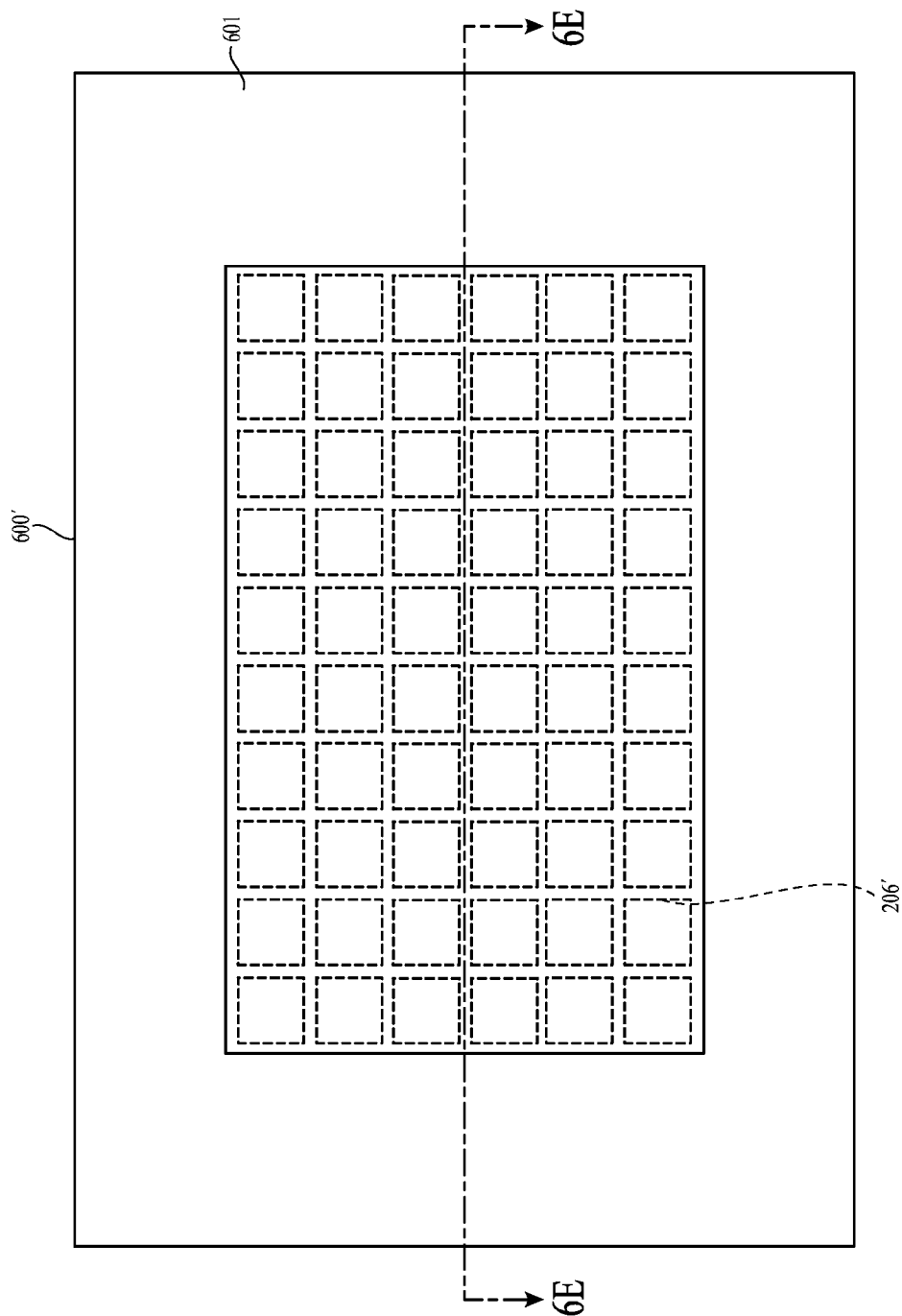
FIG. 6A is a top plan drawing illustrating an example patterned conductive layer of an example electrostatic lens, as described herein, in an example relationship to the example capacitive sensor array of FIGS. 5A and 5B.

FIG. 6A illustrates example patterned conductive layer 600'. Example patterned conductive layer 600' includes a patterned conductor, which is formed into conductive ring 601 concentric with array 206' of capacitive sensing elements. In this example, patterned conductor 601 includes only one rectangular ring with an inner length and inner width matching those of array 206 of capacitive sensing elements and an outer length and outer width matching those of the dielectric structure. These selections are for illustrative purposes only and are not intended as limiting. For example, FIG. 6D illustrates alternative example patterned conductive layer 600"" that includes two conductive rings 610 and 612. Conductive ring 610 has a rectangular outer edge like conductive ring 601 of FIG. 6A, but rounded rectangular inner edge, while both the inner and outer edges of conductive ring 612 are rounded rectangles. The use of rounded corners within the patterned conductive layers may lead to smoother bending of field lines by the electrostatic lens. It is noted that the two conductive rings 610 and 612 in FIG. 6D may be coupled to the same relative voltage, or may be coupled to different relative voltages. Alternatively, one or both of these conductive rings may be left to float.

It is contemplated that other shaped conductive rings, such as ovals or circles, may also be used in example electrostatic lenses, as described herein.

Figure 6B:
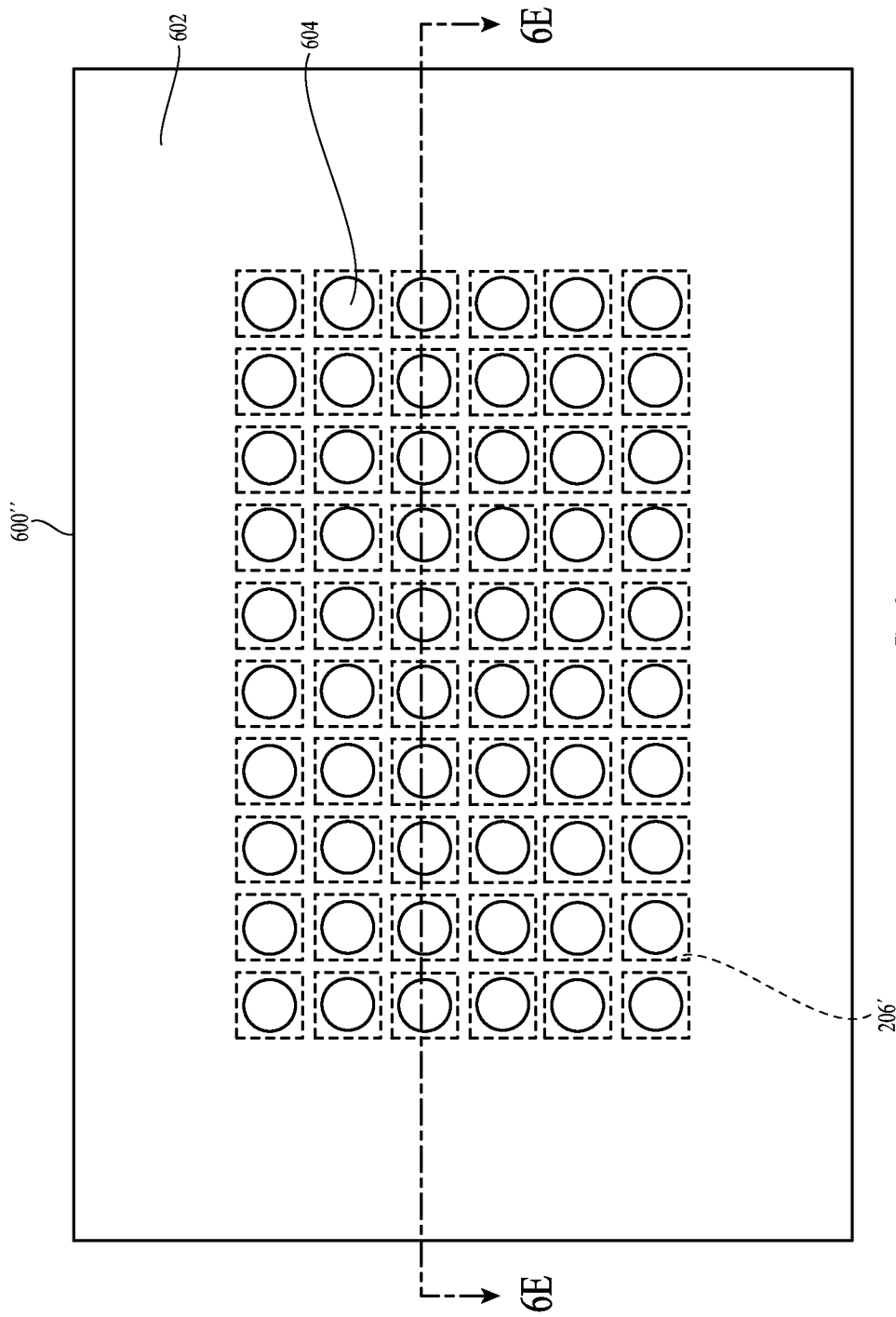
FIG. 6B is a top plan drawing illustrating another example patterned conductive layer of an example electrostatic lens, as described herein, in an example relationship to the example capacitive sensor array of FIGS. 5A and 5B.
Figure 6C:
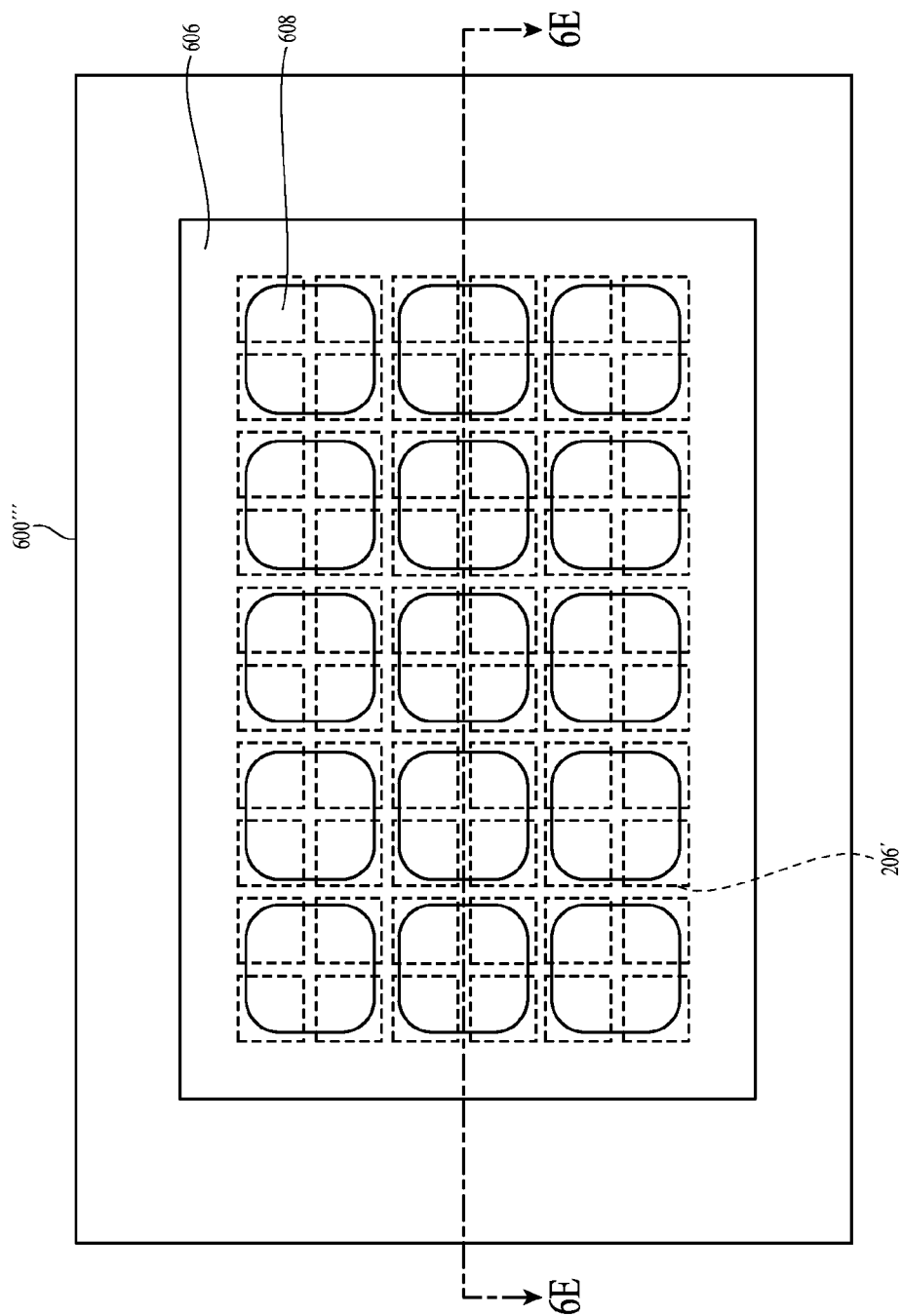
FIG. 6C is a top plan drawing illustrating a further example patterned conductive layer of an example electrostatic lens, as described herein, in an example relationship to the example capacitive sensor array of FIGS. 5A and 5B.
Figure 6D:
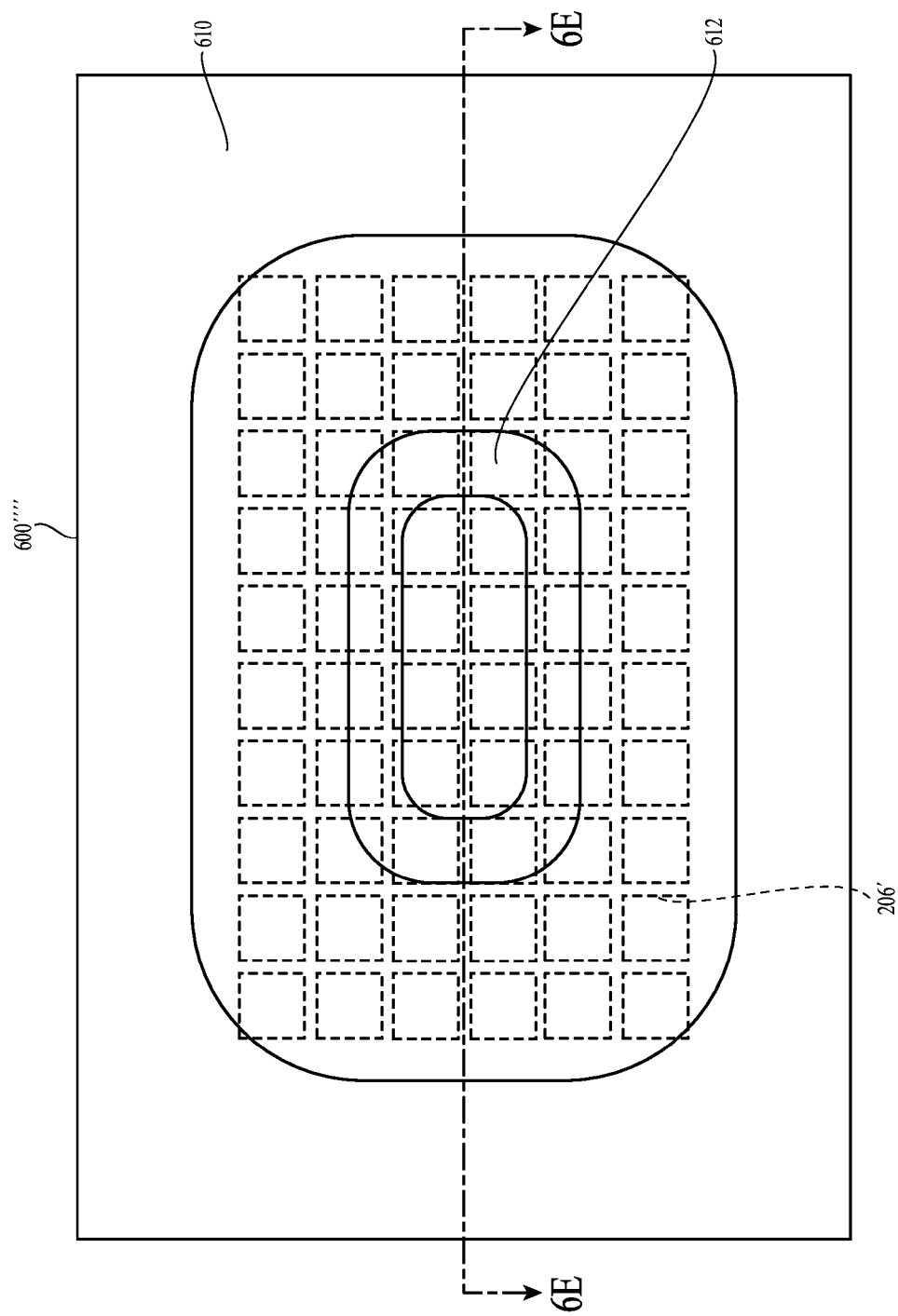
FIG. 6D is a top plan drawing illustrating yet another example patterned conductive layer of an example electrostatic lens, as described herein, in an example relationship to the example capacitive sensor array of FIGS. 5A and 5B.

FIG. 6B illustrates another example patterned conductive layer 600". In this example, conductor 602 is patterned to include an array of openings 604 corresponding to the individual capacitive sensing elements of array 206'. FIG. 6C illustrates similar example patterned conductive layer 600"', in which conductor 606 is patterned to include an array of openings 608 that correspond to two by two blocks of capacitive sensing elements of array 206'.

In FIG. 6B, example patterned conductive layer 600" includes circular openings 604 and conductor 602 is illustrated as extending to the edges of the dielectric structure, while in FIG. 6C, example patterned conductive layer 600"' includes rounded square openings 608 and conductor 606 is illustrated as extending just beyond the edges of array 206' of capacitive sensing elements. These choices are merely illustrative and not intended as limiting. For example, numerous other shapes may be used depending on the geometry of the device and how the designer wishes to shape the electric field. Alternative example opening shapes include, but are not limited to: substantially rectangular openings; substantially cruciform openings; substantially square openings; substantially rectangular openings with rounded corners; and substantially cruciform openings with rounded corners.

FIG. 6E is a cross-section view of all four of the example patterned conductive layers of FIGS. 6A-6D, illustrating their example patterns relative to example array 206' of capacitive sensing elements. FIG. 6E illustrates example electrostatic lens 202"', including patterned conductive layers 600', 600", 600"', and 600"" of FIGS. 6A-D, respectively. In this example electrostatic lens, patterned conductive layers 600', 600", 600"', and 600"" are illustrated as being formed within a dielectric structure. Such example patterned conductive layers may be formed by multiple means, such as deposition and etching, lamination, and printing, depending on the material.

FIG. 6F is a cross-section drawing of another example capacitive sensor array of FIGS. 5A and 5B. Each capacitive sensing element of the array of capacitive sensing elements has a first electrode 614 and a second electrode 616. The first electrodes are closer to the sensor surface of the dielectric structure than the second electrodes. In yet another embodiment, instead of discrete electrodes, either the first electrodes 614 or the second electrodes 616 can be configured as a common electrode. Thus, each capacitive sensing element of the array of capacitive sensing elements may include a common electrode.

Figure 7:
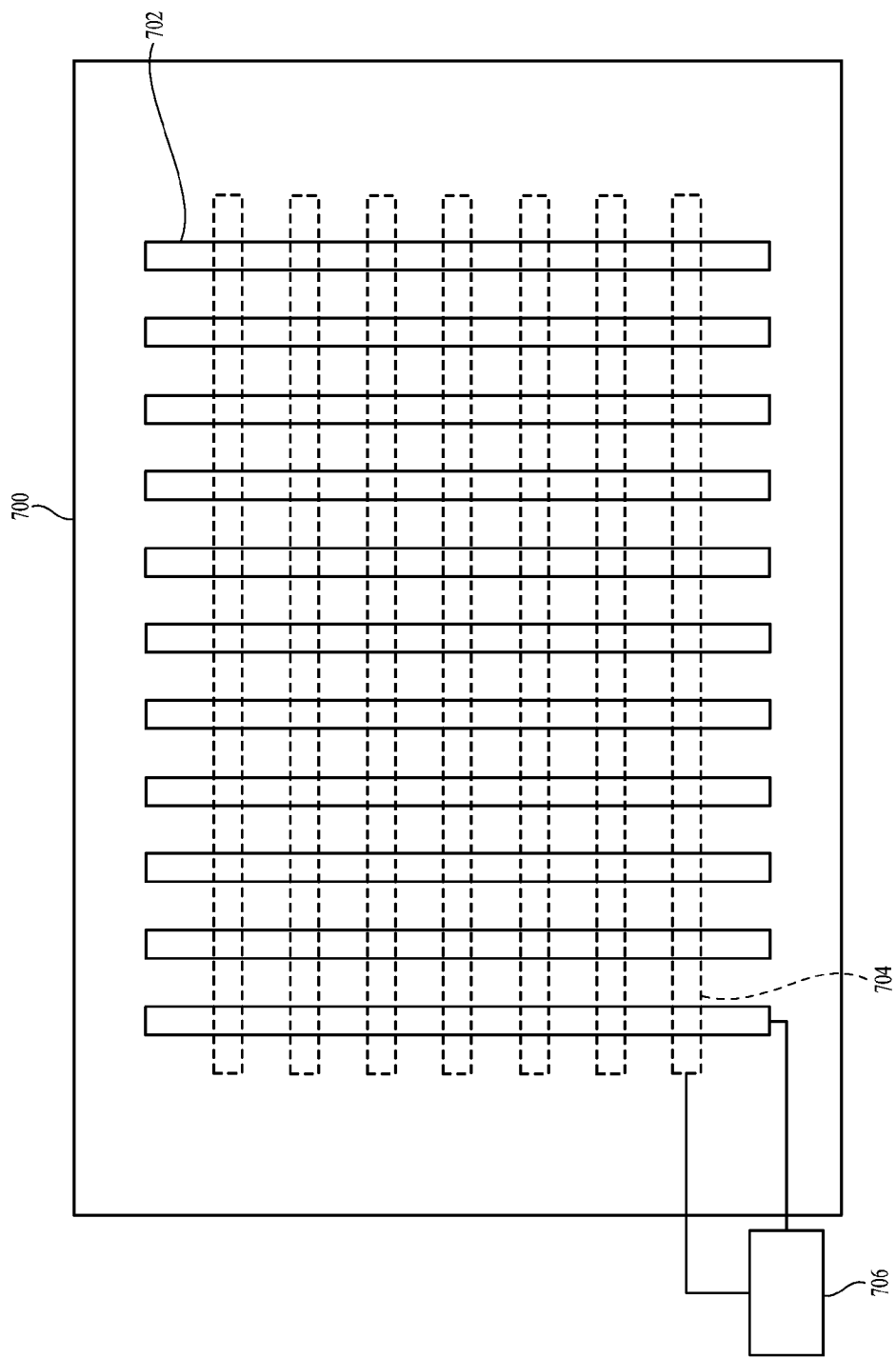
FIG. 7 is a top plan drawing illustrating an example electrostatic lens, as described herein, including two example patterned conductive layers.

FIG. 7 illustrates another example electrostatic lens 700. This example electrostatic lens includes two patterned conductive layers. The first patterned conductive layer includes a first set of substantially equally spaced parallel conductive lines 702. The second patterned conductive layer includes a second set of substantially equally spaced parallel conductive lines 704. These two sets of parallel conductive lines are arranged substantially perpendicular to each other and separated by an insulating layer. Each set of parallel conductive lines may be used to shape the electric field by bending the electric field in a direction perpendicular to the lines. Using the two sets of parallel conductive lines 702 and 704 as shown in FIG. 7 may allow for the electric field to be shaped to help focus the electric field information from a small area of the user's finger on an individual capacitive sensing element (similar the example embodiment of FIG. 6B), or a block of capacitive sensing elements (similar the example embodiment of FIG. 6C).

The pitch of parallel conductive lines 702 and parallel conductive lines 704 are shown to be approximately equal in FIG. 7; however, this is not necessary. The pitches of parallel conductive lines 702 and parallel conductive lines 704 may be selected to be whatever size is useful for improving the resolution of the example capacitive fingerprint sensor based on the geometry of the consumer electronic device that contains the example capacitive fingerprint sensor and the capacitive sensing elements. The ratio between width of the conductive lines and the pitch may also be selected based on the device and sensor parameters.

In some example embodiments described herein (referring to the horizontal dimension as width and the vertical dimension as length), it may be useful for the pitch of parallel conductive lines 702 to be approximately equal to the width of a capacitive sensing element of the array of capacitive sensing elements and for the pitch of parallel conductive lines 704 to be approximately equal to the length of a capacitive sensing element. Alternatively, the pitches of parallel conductive lines 702 and 704 may be chosen to be approximately equal to the width and length, respectively, of a block of capacitive sensing elements of the array of capacitive sensing elements.

In example electrostatic lens 700 of FIG. 7, each line in these sets of parallel conductive lines is shown as separate from the other parallel lines in its set, which may allow the individual lines to be coupled to different voltages relative to the array of capacitive sensing elements. This arrangement may be used to allow for extra bending of the electric field near edges of the capacitive sensor array, or may be used to allow 'beam-shaping' of the electric field. Such beam-shaping capabilities may allow for centering of the fingerprint image on the array of capacitive sensing elements when the user's finger is not centered, or may allow for focusing on one portion of the fingerprint image.

It is also contemplated that one or both sets of parallel conductive lines 702 and 704 may be coupled at one or both ends with additional conductive material so that all of the lines of the patterned conductive layer may be held at a common relative voltage. However, this does not mean that each set of parallel conductive lines 702 and 704 need be held at the same common relative voltage. Using different relative voltages for the two patterned conductive layers in example electrostatic lens 700 may allow the electric field to be shaped to different degrees in the two directions, which may allow for astigmatic corrections to the fingerprint image.

The relative voltage setting of the patterned conductive layers may be controlled by a voltage source 706 that provides a voltage offset to each patterned conductive layer. Each patterned conductive layer may be electrically coupled to a voltage source such that each patterned conductive layer has a voltage offset from the first electrodes of the array of capacitive sensing elements. For simplicity and clarity, a voltage source 706 is shown in FIG. 7 electrically connected to one conductive line in the first set of conductive lines 702 and one conductive line in the second set of conductive lines 704. In one example embodiment, each voltage offset can be substantially equal to one of multiple voltage offsets that the voltage source is configured to output. Additionally, the voltage source may be configured so that the voltage offset provided to each patterned conductive layer is variable, thus allowing the electrostatic lens to be tuned.

Figure 8A:
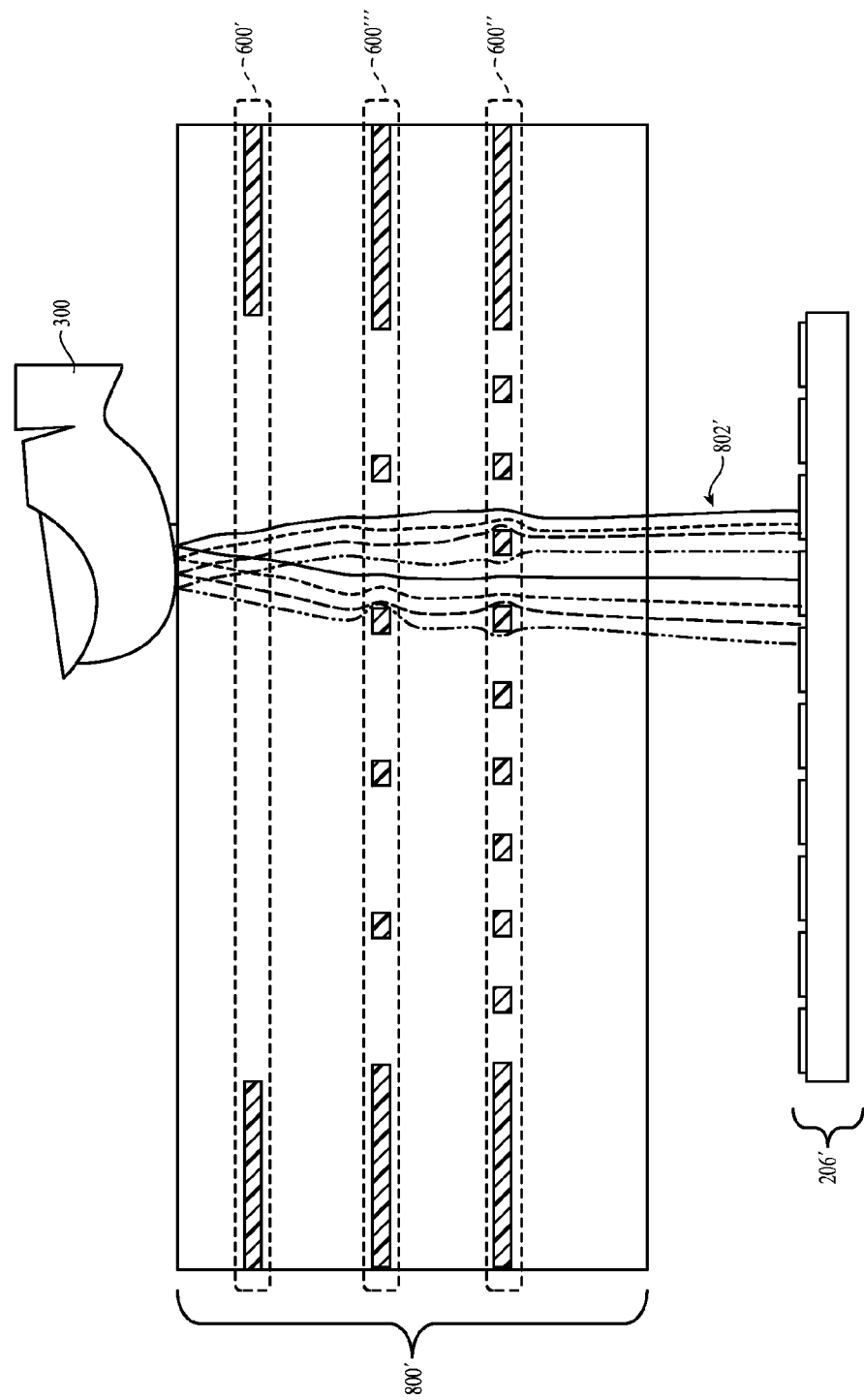
FIG. 8A is a cross-section drawing illustrating an example electrostatic lens, as described herein, including the example patterned conductive layers of FIGS. 6A-6C taken along dotted line 6E-6E.
Figure 8B:
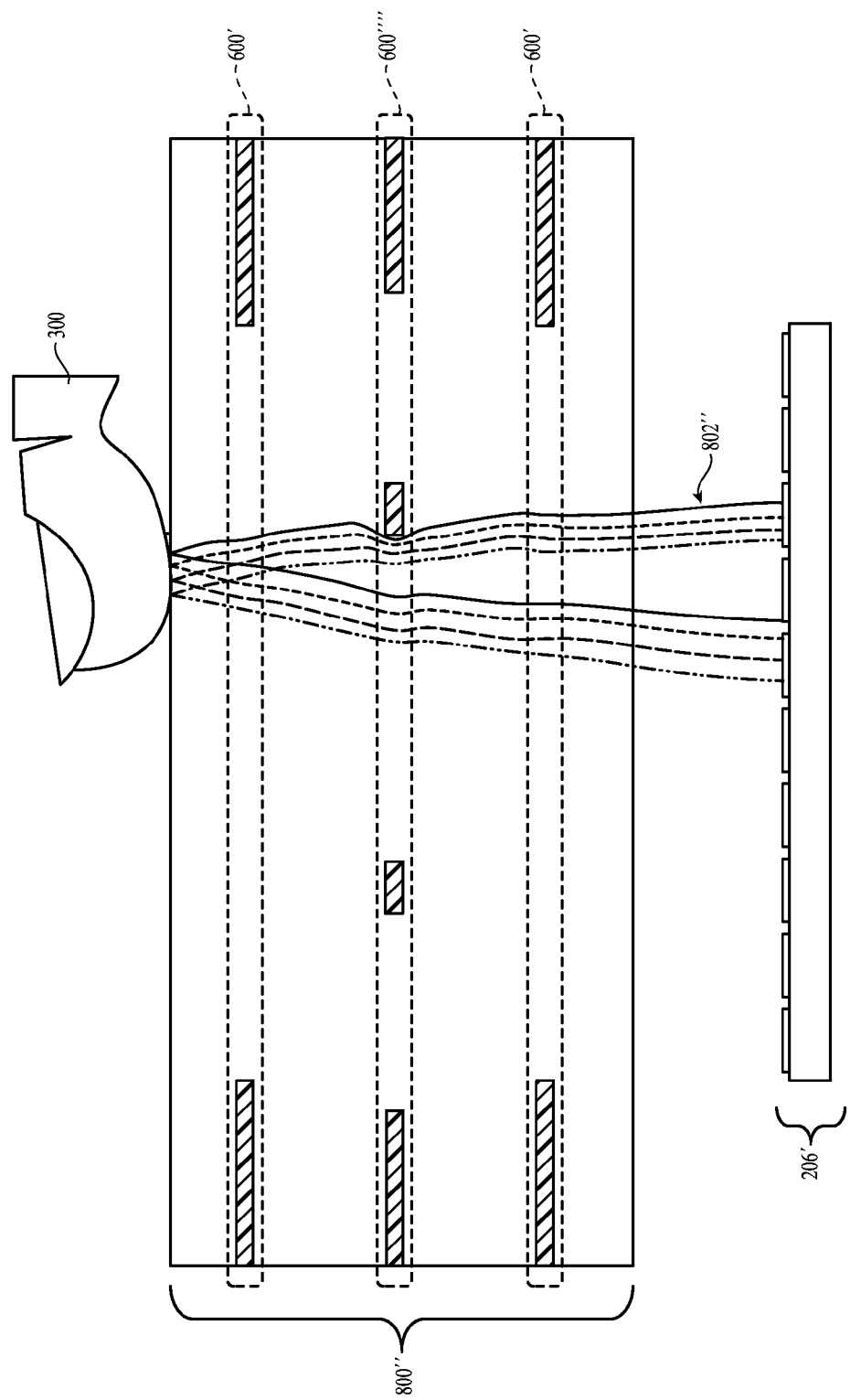
FIG. 8B is a cross-section drawing illustrating another example electrostatic lens, as described herein, including the example patterned conductive layers of FIGS. 6A and 6D taken along dotted line 6E-6E.
Figure 8C:
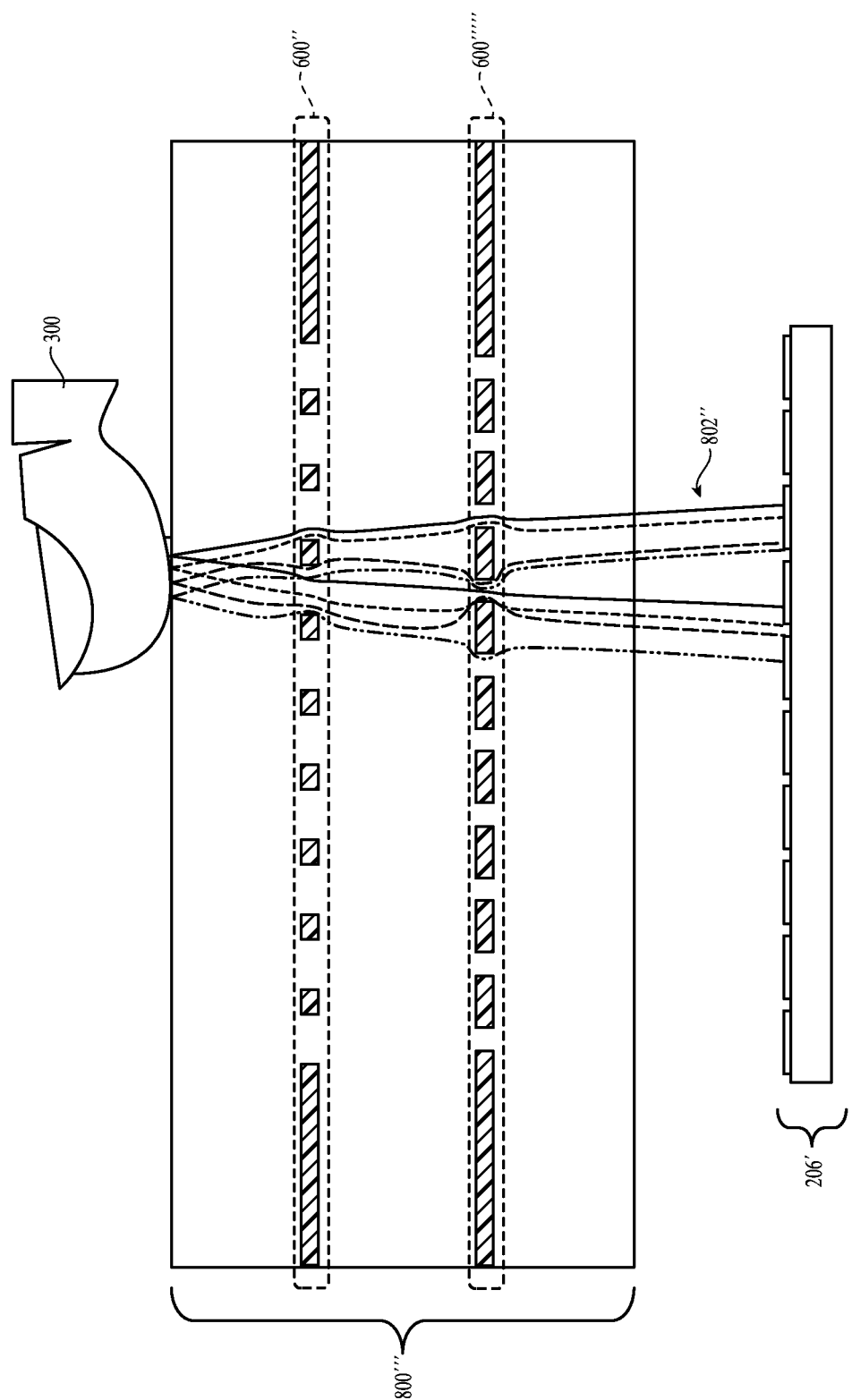
FIG. 8C is a cross-section drawing illustrating a further example electrostatic lens, as described herein, including the example patterned conductive layer of FIG. 6C taken along dotted line 6E-6E.

FIGS. 8A-8C illustrate three example embodiments of electrostatics lens, as described herein, that may be formed from multiple patterned conductive layers arranged together. Examples illustrating how the electric field from a user's finger may be shaped by these example electrostatic lenses are included in these figures as well. These example embodiments are provided for illustrative purposes and are not intended as limiting. As noted above, design of a specific electrostatic lens for an example capacitive fingerprint sensor, as described herein, may usefully take into account various parameters of the specific consumer electronic devices for which the electrostatic lens is designed. One skilled in the art may understand how to create such a design without undue experimentation.

Example electrostatic lens 800' of FIG. 8A includes three patterned conductive layers having different types of patterns. Moving downward from the layer closest to the contact surface toward array 206' of capacitive sensing elements, first example patterned conductive layer 600' (described in detail above with reference to FIG. 6A) includes a conductive ring concentric with array 206' of capacitive sensing elements. Second example patterned conductive layer 600''' (described in detail above with reference to FIG. 6C) includes an array of openings corresponding to two by two blocks of capacitive sensing elements in array 206'. Third example patterned conductive layer 600" (described in detail above with reference to FIG. 6B) includes an array of openings corresponding to individual capacitive sensing elements of array 206'.

Cones 802' illustrate how these example patterned conductive layers of electrostatic lens 800' may shape the electric field information associated with four areas of user's finger 300 (represented by the four cones 802' shown in different dash patterns with apices on the corresponding areas of user's finger 300).

As illustrated, the first patterned conductive layer 600' helps to reduce the spreading of the electric field information. Second patterned conductive layer 600''' largely focuses cones 802' of electric field information for all four finger areas within one opening corresponding to the two by two element block that corresponds to all four finger areas. Third patterned conductive layer 600" then focuses cones 802' of electric field information onto single capacitive sensing elements of array 206'. This approach of incrementally narrowing the focus of the electric field information represented by cones 802' may significantly reduce blurring of the electric field between the contact surface and array 206' of capacitive sensing elements.

Example electrostatic lens 800" of FIG. 8B includes three similarly patterned conductive layers, arranged symmetrically, with the first and third layers having the same shape and second layer having a different shape. First and third example patterned conductive layers 600' (described in detail above with reference to FIG. 6A) include a conductive ring concentric with array 206' of capacitive sensing elements. Second example patterned conductive layer 600' (described in detail above with reference to FIG. 6D) includes two conductive rings concentric with array 206'. In example electrostatic lens 800" of FIG. 8B, both conductive rings of second example patterned conductive layer 600"" have different inner widths than the conductive rings of first and third example patterned conductive layers 600'. This selection of the sizes of the conductive rings is for illustrative purposes and is not intended as limiting.

Cones 802" illustrate how these example patterned conductive layers of electrostatic lens 800" may shape the electric field information associated with four areas of user's finger 300.

As illustrated, the first patterned conductive layer 600' helps to reduce the spreading of the electric field information. Second patterned conductive layer 600"" further reduces the spreading of cones 802', particularly distinguishing that all four areas of user's finger 300 are within the inner width of the inner conductive ring of patterned conductive layer 600"". Third patterned conductive layer 600' then continues the spreading reduction of cones 802' of electric field information to reduce blurring of the electric field between the contact surface and array 206' of capacitive sensing elements.

Example electrostatic lens 800''' of FIG. 8C includes two similarly patterned conductive layers. First example patterned conductive layer 600" (described in detail above with reference to FIG. 6B) includes an array of openings corresponding to individual capacitive sensing elements of array 206'. Second example patterned conductive layer 600"" also includes an array of openings corresponding to individual capacitive sensing elements of array 206'; however, as illustrated in FIG. 8C, the openings in second example patterned conductive layer 600"" are smaller (i.e. have a smaller width) than the openings in first example patterned conductive layer 600" of example electrostatic lens 800'''. The relative size of these openings is merely illustrative and is not intended as limiting. It is contemplated that similar example electrostatic lenses, as described herein, may include patterned conductive layers in which both arrays of openings are equally sized, or in which the openings of the second patterned conductive layer may be larger than the openings in the first patterned conductive layer.

Cones 802''' illustrate how these example patterned conductive layers of electrostatic lens 800''' may shape the electric field information associated with four areas of user's finger 300.

As illustrated, the first patterned conductive layer 600" largely focuses cones 802''' of electric field information for all four finger areas within two opening corresponding to the two capacitive sensing elements that most closely correspond to all four finger areas, with the majority of the electric field information in one opening. Second patterned conductive layer 600"" then squeezes this majority of the electric field information represented by cones 802' through a single opening and onto a single capacitive sensing elements of array 206'.

Figure 9:
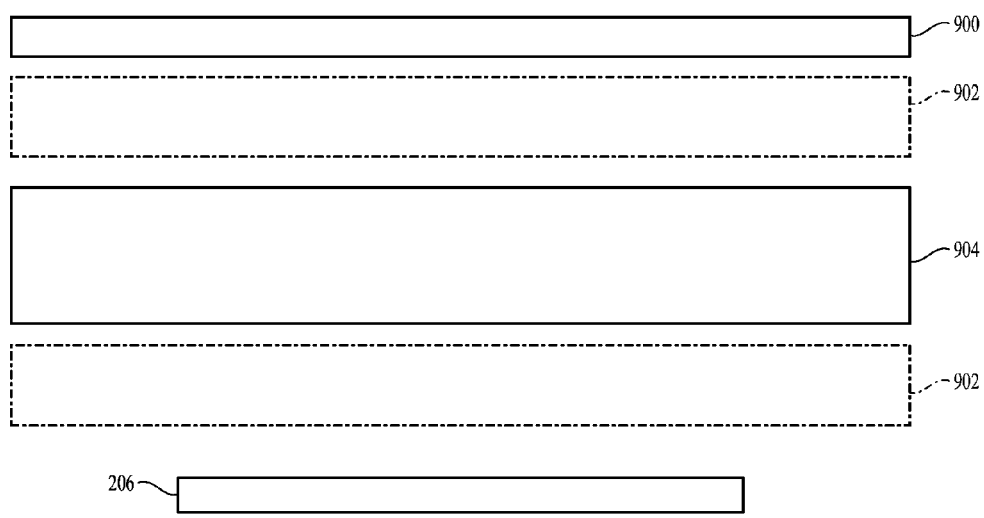
FIG. 9 is a side plan drawing of an alternative example embodiment of a capacitive sensor and electrostatic lens structure, as described herein.

FIG. 9 illustrates an alternative example embodiment of a capacitive fingerprint sensor, as described herein. This alternative example capacitive fingerprint sensor includes: cover glass 900; display stack 904; array 206 of capacitive sensing elements; and electrostatic lens 902. In this example embodiment, cover glass 900, display stack 904, and electrostatic lens 902 are formed as separate components that may be coupled together, rather than being formed in a single dielectric structure. As in the example embodiments described above with reference to FIGS. 2 and 4A-4C, electrostatic lens 902 may be coupled between display stack 904 and array 206 of capacitive sensing elements, or between cover glass 900 (the outer surface of which is the contact surface as in dielectric structure 202 of the example embodiments described above with reference to FIGS. 2 and 4A-4C) and display stack 904. Alternatively, electrostatic lens 902 may be formed of two separate subcomponents, with one subcomponent coupled between display stack 904 and array 206 and the other subcomponent coupled between cover glass 900 and display stack 904.

As with other exemplary embodiments described herein, electrostatic lens 902 is adapted to improve the resolution by array 206 of capacitive sensing elements of the fingerprint of a user's finger that is in contact with cover glass 900. This may be accomplished by electrostatic lens 902 being adapted to substantially shape the electric field associated with the user's finger in the region between cover glass 900 and array 206 of capacitive sensing elements.

As described above, electrostatic lens 902 includes one or more patterned conductive layer(s). In example embodiments of FIG. 9, the patterned conductive layer(s) may be formed on a dielectric substrate or may be stand-alone patterned conductors, such as, for example, a metal plate, which may be stamped or otherwise formed to have the selected pattern.

Figure 10:
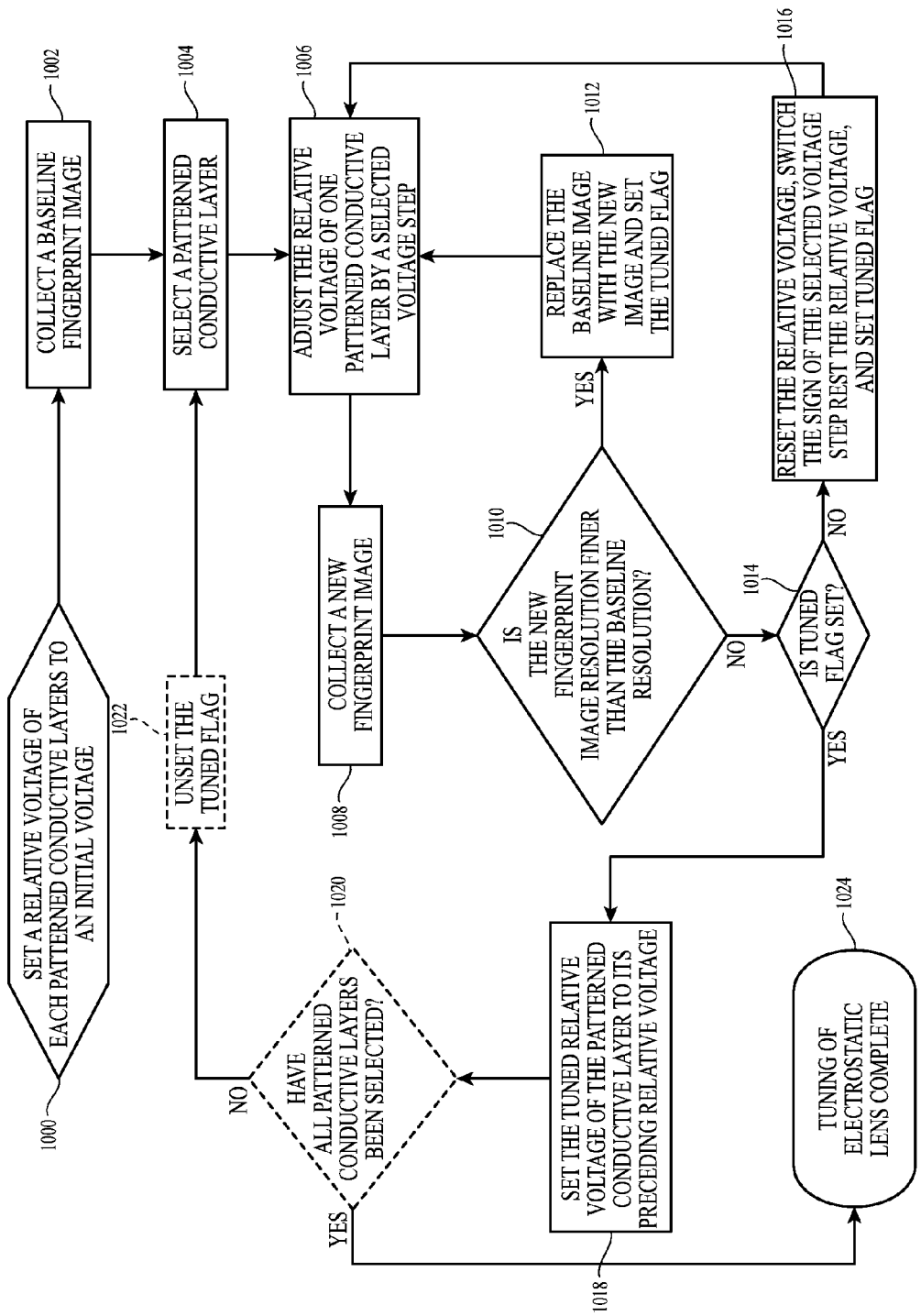
FIG. 10 is a flowchart illustrating an example tuning method for an example electrostatic lens structure, as described herein.

FIG. 10 is a flowchart illustrating an example method for tuning an electrostatic lens used in a capacitive fingerprint sensor, as described herein, in which the electrostatic lens includes one or more patterned conductive layer(s). This example tuning method may be used during fabrication of the consumer electronics device and/or during operation of the capacitive fingerprint sensor. In this example method, a relative voltage of each of the patterned conductive layer(s) is set to an initial voltage relative to the array of capacitive sensing elements of the capacitive fingerprint sensor (step 1000). The initial voltage(s) may be preselected based on the geometry and other parameters of the capacitive fingerprint sensor, or may be equal to the tuned voltage(s) from a previous fingerprint collection by the capacitive fingerprint sensor.

A baseline fingerprint image is collected at step 1102 using the initial voltage(s). If the electrostatic lens includes multiple patterned conductive layers (or one or more patterned conductive layer(s) that include sections that may be set to different relative voltages, such as patterned conductive layer 600"" of FIG. 6D or patterned conductive layers 702 and 704 of FIG. 7), one patterned conductive layer is selected at step 1004.

The relative voltage of the selected patterned conductive layer (patterned conductive layer section) is adjusted by a selected voltage step (step 1006). The initial voltage step may have either sign (positive or negative). The magnitude of the selected voltage step may be determined based on the range over which it is anticipated that the relative voltage(s) are likely to be tuned, which may vary based on the geometry of the capacitive fingerprint sensor.

A new fingerprint image is collected at step 1008. The resolution of this new fingerprint image (the new image resolution) is compared to the baseline resolution of the baseline fingerprint image and a determination is made as to whether the new image resolution is finer that the baseline image resolution (step 1010). This comparison may be done visually, by displaying both images on a display of the consumer electronics device, or automatically through an analysis of various statistics of the two images. Such statistics may include average contrast, maximum contrast, statistics related to image sharpness, discreet cosine transfer coefficients, and so on.

If the new image resolution is determined to be finer that the baseline resolution, the baseline fingerprint image is replaced with the new fingerprint image and a tuned flag is set (step 1012). The tuned flag indicates that the relative voltage of the patterned conductive layer has been tuned for its initial value. Then steps 1006, 1008, and 1010 are repeated until a new fingerprint image is collected that has a resolution that is not finer than the baseline resolution of the current baseline image.

Once a new fingerprint image is collected that has a resolution that is not finer than the baseline resolution of the current baseline image, it is determined whether the tuned flag has been set at step 1014. If the tuned flag has not been set, this indicates that the adjustment of the relative voltage by the selected voltage step has not improved the image resolution. The relative voltage is reset to the initial voltage, the sign of the selected voltage step is switched, and the tuned flag is set (step 1016). The tuned flag is set so that, if the initial voltage is the relative voltage that leads to the finest image resolution, the method does not get stuck in a loop. Then steps 1006, 1008, and 1010 are repeated until a new fingerprint image is collected that has a resolution that is not finer than the baseline resolution of the current baseline image.

When it is determined at step 1014 that the tuned flag is set, the tuned relative voltage of the patterned conductive layer is set to its preceding relative voltage, i.e. the relative voltage that corresponds to the current baseline fingerprint image, step 1018.

If there are multiple patterned conductive layers in the electrostatic lens (and/or if one or more patterned conductive layer(s) include multiple sections that may be set to different relative voltages), it may be useful to tune the relative voltages of these other patterned conductive layers (or sections thereof) as well. Thus, it may be useful to determine whether all patterned conductive layers have been selected for tuning (step 1020). If not all patterned conductive layers to be selected for tuning have been selected, then the tuned flag is unset at step 1022, and steps 1004 through 1018 are repeated. Steps 1020 and 1022 are shown in dashed boxes to indicate that these are alternative steps.

Once all of the patterned conductive layers to be selected for tuning have been selected, the tuning of the electrostatic lens is complete (step 1024).

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

I claim:

1. A capacitive fingerprint sensor, comprising:
a dielectric structure having a contact surface and a sensor surface;
an array of capacitive sensing elements held on or near the sensor surface of the dielectric structure; and
an electrostatic lens formed within the dielectric structure.

2. The capacitive fingerprint sensor of claim 1, wherein the dielectric structure includes a plurality of layers forming a display stack.

3. The capacitive fingerprint sensor of claim 1, wherein the dielectric structure includes a drive ring formed on the contact surface of the dielectric structure, and wherein a DC offset potential between the drive ring and the array of capacitive sensing elements is substantially equal to a predetermined DC voltage.

4. The capacitive fingerprint sensor of claim 1, wherein the dielectric structure includes a drive ring formed within the dielectric structure, proximate to the contact surface, and wherein a DC offset potential between the drive ring and the array of capacitive sensing elements is substantially equal to a predetermined DC voltage.

5. The capacitive fingerprint sensor of claim 1, wherein the dielectric structure includes a plurality of layers forming a touchscreen proximate to the contact surface.

6. The capacitive fingerprint sensor of claim 5, wherein the touchscreen is one of:
   a resistive touchscreen;
   a capacitive touchscreen;
   an ultrasonic touchscreen; and
   an optical touchscreen.

7. The capacitive fingerprint sensor of claim 1, wherein:
   each capacitive sensing element of the array of capacitive sensing elements has a first electrode and a second electrode, the first electrodes being closer to the sensor surface of the dielectric structure than the second electrodes;
   the electrostatic lens includes a patterned conductive layer, the patterned conductive layer being:
      substantially parallel to the contact surface of the dielectric structure; and
      a predetermined distance from the contact surface of the dielectric structure; and
   a potential difference between the patterned conductive layer and the first electrodes of the array of capacitive sensing elements is substantially equal to a predetermined voltage.

8. The capacitive fingerprint sensor of claim 7, wherein the patterned conductive layer of the electrostatic lens includes at least one conductive ring concentric with the array of capacitive sensing elements.

9. The capacitive fingerprint sensor of claim 7, wherein the patterned conductive layer of the electrostatic lens includes an array of openings corresponding to the array of capacitive sensing elements.

10. The capacitive fingerprint sensor of claim 9, wherein the array of openings of the patterned conductive layer of the electrostatic lens are one of:
   substantially round;
   substantially square;
   substantially rectangular;
   substantially cruciform;
   substantially square with rounded corners;
   substantially rectangular with rounded corners; and
   substantially cruciform with rounded corners.

11. The capacitive fingerprint sensor of claim 7, wherein:
   the array of capacitive sensing elements is arranged as an array of blocks of capacitive sensing elements; and
   the patterned conductive layer of the electrostatic lens includes an array of openings corresponding to the array of blocks of capacitive sensing elements.

12. The capacitive fingerprint sensor of claim 11, wherein each block of capacitive sensing elements includes one of:
   a two by two subarray of capacitive sensing elements;
   a two by three subarray of capacitive sensing elements; and
   a three by three subarray of capacitive sensing elements.

13. The capacitive fingerprint sensor of claim 7, wherein the patterned conductive layer of the electrostatic lens is formed of at least one of: copper; silver; aluminum; gold; nickel; titanium; tungsten; carbon nanotubes; polysilicon; indium tin oxide; and a conductive polymer.

14. The capacitive fingerprint sensor of claim 1:
   further comprising a voltage source adapted to provide a plurality of voltage offsets;
   wherein:
      each capacitive sensing element of the array of capacitive sensing elements has a first electrode and a second electrode, the first electrodes being closer to the sensor surface of the dielectric structure than the second electrodes;
      the electrostatic lens includes a plurality of patterned conductive layers; and
      each patterned conductive layer is electrically coupled to the voltage source such that each patterned conductive layer has a voltage offset from the first electrodes of the array of capacitive sensing elements that is substantially equal to one of the plurality of voltage offsets of the voltage source.

15. The capacitive fingerprint sensor of claim 14 wherein:
   the plurality of voltage offsets of the voltage source are variable; and
   the electrostatic lens is adapted to be tuned by varying the plurality of voltage offsets between the plurality of patterned conductive layers and the first electrodes of the array of capacitive sensing elements.

16. The capacitive fingerprint sensor of claim 14 wherein:
   the plurality of patterned conductive layers of the electrostatic lens includes:
      a first patterned conductive layer including a first plurality of substantially equally spaced parallel lines of conductive material; and
      a second patterned conductive layer including a second plurality of substantially equally spaced parallel lines of conductive material; and
   the first plurality of substantially equally spaced parallel lines of conductive material are substantially perpendicular to the second plurality of substantially equally spaced parallel lines of conductive material.

17. The capacitive fingerprint sensor of claim 16 wherein:
   each capacitive sensing element of the array of capacitive sensing elements has a length and a width;
   a first pitch of the first plurality of substantially equally spaced parallel lines of conductive material of the first patterned conductive layer is substantially equal to the length of one capacitive sensing element of the array of capacitive sensing elements; and
   a second pitch of the second plurality of substantially equally spaced parallel lines of conductive material of the second patterned conductive layer is substantially equal to the width of one capacitive sensing element of the array of capacitive sensing elements.

18. The capacitive fingerprint sensor of claim 16 wherein:
   the array of capacitive sensing elements is arranged as an array of blocks of capacitive sensing elements;
   each block of capacitive sensing elements of the array of blocks of capacitive sensing elements has a length and a width;
   a first pitch of the first plurality of substantially equally spaced parallel lines of conductive material of the first patterned conductive layer is substantially equal to the length of one block of capacitive sensing elements; and a second pitch of the second plurality of substantially equally spaced parallel lines of conductive material of the second patterned conductive layer is substantially equal to the width of one block of capacitive sensing elements.

19. The capacitive fingerprint sensor of claim 14 wherein:
the plurality of patterned conductive layers of the electrostatic lens includes:
   a first patterned conductive layer including a first conductive ring concentric with the array of capacitive sensing elements; and
   a second patterned conductive layer including a second conductive ring concentric with the array of capacitive sensing elements;
the first conductive ring of the first patterned conductive layer has a first inner width; and
the second conductive ring of the second patterned conductive layer has a second inner width that is less than the first inner width of the first conductive ring of the first patterned conductive layer.

20. The capacitive fingerprint sensor of claim 14 wherein:
the plurality of patterned conductive layers of the electrostatic lens includes:
   a first patterned conductive layer including a first array of openings corresponding to the array of capacitive sensing elements; and
   a second patterned conductive layer including a second array of openings corresponding to the array of capacitive sensing elements;
each opening of the first array of openings of the first patterned conductive layer has a first width; and
each opening of the second array of openings of the second patterned conductive layer has a second width that is less than the first width of the openings in the first array of openings of the first patterned conductive layer.

21. The capacitive fingerprint sensor of claim 14 wherein the plurality of patterned conductive layers of the electrostatic lens includes:
   a first patterned conductive layer including at least one conductive ring concentric with the array of capacitive sensing elements; and
   a second patterned conductive layer including an array of openings corresponding to the array of capacitive sensing elements.

22. The capacitive fingerprint sensor of claim 14 wherein:
the array of capacitive sensing elements is arranged as an array of blocks of capacitive sensing elements;
the plurality of patterned conductive layers of the electrostatic lens includes:
   a first patterned conductive layer including a first array of openings corresponding to the array of blocks of capacitive sensing elements; and
   a second patterned conductive layer including a second array of openings corresponding to the array of blocks of capacitive sensing elements;
each opening of the first array of openings of the first patterned conductive layer has a first width; and
each opening of the second array of openings of the second patterned conductive layer has a second width that is less than the first width of the openings in the first array of openings of the first patterned conductive layer.

23. The capacitive fingerprint sensor of claim 14 wherein the plurality of patterned conductive layers of the electrostatic lens includes:
   the array of capacitive sensing elements is arranged as an array of blocks of capacitive sensing elements;
   a first patterned conductive layer including an array of openings corresponding to the array of blocks of capacitive sensing elements; and
   a second patterned conductive layer including one of:
      an array of openings corresponding to the array of capacitive sensing elements; or
      at least one conductive ring concentric with the array of capacitive sensing elements.

24. A capacitive fingerprint sensor, comprising:
a surface layer;
a display stack coupled to the surface layer;
an electrostatic lens coupled to the display stack; and
an array of capacitive sensing elements coupled to the electrostatic lens.

25. The capacitive fingerprint sensor of claim 24, wherein the electrostatic lens is coupled between the display stack and one of:
   the surface layer; or
   the array of capacitive sensing elements.

26. The capacitive fingerprint sensor of claim 24, wherein:
   each capacitive sensing element of the array of capacitive sensing elements includes a common electrode;
   the electrostatic lens includes at least one patterned conductive layer; and
   each patterned conductive layer of the electrostatic lens is maintained at a predetermined voltage offset from the common electrodes of the array of capacitive sensing elements.

27. The capacitive fingerprint sensor of claim 24, wherein:
   the electrostatic lens includes a plurality of patterned conductive layers;
   at least one patterned conductive layer of the electrostatic lens is coupled between the display stack and the surface layer; and
   at least one patterned conductive layer of the electrostatic lens is coupled between the display stack and the array of capacitive sensing elements.

28. The capacitive fingerprint sensor of claim 24, wherein the electrostatic lens is adapted to improve a resolution by the array of capacitive sensing elements of a fingerprint of a finger that is in contact with the surface layer.

29. The capacitive fingerprint sensor of claim 28, wherein the electrostatic lens substantially shapes an electric field associated with the finger that is in contact with the surface layer in a region between the surface layer and the array of capacitive sensing elements.

30. A capacitive fingerprint sensor, comprising:
a dielectric structure comprising:
   a contact surface;
   a sensor surface opposite the contact surface; and
   an electrostatic lens comprising an array of patterned conductors and one or more openings; and
an array of capacitive sensing elements positioned on or below the sensor surface of the dielectric structure, wherein
   each opening in the array of openings is positioned between two patterned conductors and above one or more capacitive sensing elements in the array of capacitive sensing elements.

31. The capacitive fingerprint sensor of claim 30, wherein:

the electrostatic lens comprises a first electrostatic lens comprising a first array of patterned conductors and a first array of two or more openings, wherein the patterned conductors and the two or more openings are arranged in a first pattern and each opening is positioned above two or more capacitive sensing elements, and the dielectric structure further comprises at least one of:

a second electrostatic lens positioned above the first electrostatic lens and comprising a patterned conductor formed into a conductive ring concentric with the array of capacitive sensing elements; or a third electrostatic lens positioned below the first electrostatic lens and comprising a second array of patterned conductors and a second array of openings, where the patterned conductors and the openings are arranged in a different second pattern and each opening is positioned between two patterned conductors and above one or more capacitive sensing elements.

\* \* \* \* \*